United States Patent [19]
Mizui et al.

[11] Patent Number: 5,238,590
[45] Date of Patent: Aug. 24, 1993

[54] LUBRICANT OIL, POLYALKYLENE GLYCOL POLYCARBONATES AND PROCESS FOR PREPARING THEM

[75] Inventors: Kinya Mizui, Ichihara; Yoshihisa Kiso, Kuga; Tetsuo Hayashi, Kuga; Masahide Tanaka, Kuga, all of Japan

[73] Assignee: Mitsui Petrochemical Industries, Ltd., Tokyo, Japan

[21] Appl. No.: 588,833

[22] Filed: Sep. 27, 1990

[30] Foreign Application Priority Data

Sep. 29, 1989 [JP] Japan .................. 1-256032
Dec. 12, 1989 [JP] Japan .................. 1-321825
Apr. 27, 1990 [JP] Japan .................. 2-112210

[51] Int. Cl.$^5$ .............. C10M 105/48; C10M 107/20; C07C 69/96
[52] U.S. Cl. .................. 252/52 A; 252/56 R; 252/68; 558/266; 558/265
[58] Field of Search .................. 558/266, 265; 252/68, 252/52 A, 56 R

[56] References Cited

U.S. PATENT DOCUMENTS

| 1,845,356 | 2/1932 | Sorensen | 252/67 |
| 2,379,252 | 10/1941 | Muskat et al. | 558/266 |
| 2,385,932 | 3/1942 | Muskat et al. | 558/266 |
| 2,387,934 | 6/1942 | Muskat et al. | 558/266 |
| 3,627,810 | 12/1971 | Chang | 558/276 |
| 3,657,310 | 4/1972 | Frevel | 558/276 |
| 3,725,455 | 4/1973 | D'Angelo et al. | 558/266 |
| 4,072,704 | 2/1978 | Langdon | 558/266 |
| 4,217,298 | 8/1980 | Shikata et al. | 558/265 |
| 4,293,503 | 10/1981 | Young | 558/266 |
| 4,512,930 | 4/1985 | Romano | 558/265 |
| 4,755,316 | 7/1988 | Magid et al. | 252/68 |
| 4,948,525 | 8/1990 | Sasaki et al. | 252/68 |

FOREIGN PATENT DOCUMENTS

| 63395 | 4/1982 | Japan | 252/68 |
| 182337 | 7/1988 | Japan | 558/265 |

Primary Examiner—Prince Willis, Jr.
Assistant Examiner—J. Silbermann
Attorney, Agent, or Firm—Sherman and Shalloway

[57] ABSTRACT

The present invention provides lubricant oil compositions comprising polyalkylene glycol polycarbonates. The lubricant oil compositions are useful as industrial gear oils, automotive gear oils, lubricant oils for refrigerators and rolling installations. The lubricant oils exhibit excellent lubricating properties and detergency and also have mutual solubility with an ozone layer nondestructive Freon such as R-134a. The lubricants of the present invention are especially suited for refrigerator systems using a hydrogenated fluorocarbon as a refrigerant.

8 Claims, 5 Drawing Sheets

LUBRICANT OIL, POLYALKYLENE GLYCOL POLYCARBONATES AND PROCESS FOR PREPARING THEM

FIELD OF THE INVENTION

The present invention relates to lubricant oil compositions, more particularly to lubricant oil compositions used for industrial gear oil, automotive engine oil, automotive gear oil, lubricant oil for refrigerators, lubricant oil for rolling and lubricant oil for fibers which are excellent in lubricating properties and detergency. The present invention relates still more particularly to lubricant oil compositions used for refrigerators where hydrogenated fluorocarbon (HFC) such as Freon R-134a which is nondestructive to the ozone layer is used as a refrigerant.

This invention further relates to novel polyalkylene glycol polycarbonates and processes for preparing them, and more particularly to polyalkylene glycol polycarbonates which have a polyoxypropylene group in the molecular chain and also have an alkyl group and an alkyloxyalkylene group at the molecular terminals, and which are useful, for instance, as a lubricant oil or a component therefor, and processes for preparing them.

BACKGROUND OF THE INVENTION

Lubricant oils have been industrially used as gear oil, engine oil, lubricant oil for refrigerators, lubricant oil for fibers, lubricant oil for rolling, etc.

As the working conditions for various industrial machines become severe recently, industrial gear oil has come to be required to maintain their lubricating properties and detergency at high temperature. In particular, improved lubricating properties and detergency have come to be required for the industrial gear oil used in the process for baking food and thermosetting coating. There have heretofore been used lubricant oils of synthetic hydrocarbon type, carboxylic acid ester type or glycol type.

Synthetic hydrocarbon lubricant oil and carboxylic acid ester lubricant oil, however, are still insufficient in lubricating properties, and in addition they have such a drawback that they cannot be used as lubricant oil at high temperature because they form carbide when heated over a long period of time. On the other hand, though glycol lubricant oil is advantageous in that it does not form much carbide when heated over a long period of time, it has insufficient lubricating properties and high hygroscopicity. Accordingly, improvement thereof has been desired.

Engine oil has been required to have lubricating properties and dispersancy at higher temperature over a longer period to cope with improved performance of automotive engines. When addition of the additives for the engine oil is attempted to respond to such a requirement, it results in an increase in the addition amount thereof. The increase in the addition amount thereof induces harmful results such as precipitation or deposition of mayonnaise sludge.

Though there has heretofore been tried use of mineral oil in combination with synthetic hydrocarbon oil or carboxylic acid ester oil, the resultant base oil shows both insufficient lubricating properties and dispersancy when used at high temperature over a long period of time.

Lubricant oil for 2 cycle engines, different from that for the above-mentioned automobile engines, that is 4-cycle engines, is burnt after it is added to gasoline due to the mechanism of the engines, and therefore its detergency is especially important. Though castor oil, polybutene and the like have been used as lubricant oil for 2-cycle engines, both their lubricating properties and detergency are insufficient.

Gear oil for automobiles, especially for ATF is required to have a low friction coefficient and decreased change thereof with the lapse of time. Antifriction agents and friction-adjusting agents have therefore been used. Automotive gear oil containing these additives has a problem that the friction coefficient thereof increases with time.

With the alteration of a refrigerant gas for refrigerators to Freon R-134a ($CH_2F-CF_3$) which is an ozone layer-nondestructive HFC, mineral oil and alkylbenzenes, which heretofore have been used for lubricant oil for refrigerators, have come not to be used therefor because it has no mutual solubility with the refrigerant gas. Glycol ether type lubricant oil has currently been developed for the lubricant oil for refrigerators where the above-mentioned refrigerant is used.

For example, U.S. Pat. No. 4,755,316 discloses a compression refrigerator composition composed of tetrafluoroethane and a polyoxyalkylene glycol having a molecular weight of 300 to 2,000 and a kinematic viscosity at 37° C. of about 25 to 150 cSt. Such glycol ether lubricant oil, however, generally has insufficient thermal stability and high hygroscopicity, and it shrinks rubber sealing materials such as nitrile rubber (NBR) and increases their hardness.

As lubricant oil for fibers, carboxylic acid lubricant oil and glycol lubricant oil have usually been employed, but they cannot simultaneously satisfy lubricating properties and detergency.

Lubricant oil containing tallow as its main ingredient has been conventionally used as rolling lubricant oil. In spite of its high lubricating properties and sufficient rolling efficiency, such lubricant oil is extremely poor in detergency, and hence it requires a process for washing the remaining tallow. Though carboxylic acid ester lubricant oil has been used as rolling lubricant oil, it shows little practicality due to poor lubricating properties, despite its excellent detergency.

U.S. Pat. No. 3,627,810 discloses a process for preparing carbonates of higher alcohols, and the carbonates are described to be useful as hydraulic oil, lubricant oil and plasticizers.

U.S. Pat. No. 3,657,310 discloses a process for preparing carbonates represented by the formula ROCOO-$(AO)_nR'$. These carbonates are monocarbonates having alkyl group at the molecular terminals and having a polyoxyalkylene group in the molecular chain, and they are described to be useful as lubricant oil, hydraulic oil and plasticizers. In the above-mentioned formula, R and R' denote a monovalent aliphatic group, and A indicates an alkylene group having 2 to 4 carbon atoms, with n denoting an integer of not less than 1.

European Patent No. 089,709 discloses a process for preparing a carbonate of a higher alcohol by ester interchange reaction between a higher alcohol having a molecular weight of 100 to 270 and an alcohol carbonate having a low boiling point, and a lubricant oil composition containing such a carbonate of a higher alcohol.

Japanese Patent L-O-P No. 37,568/1973 discloses a motor transmitting liquid containing at least one carbonates represented by the general formula $$R^1O\!+\!X\!-\!OCOO\!\rightarrow_{\!n}\!X\!-\!OR^2$$

wherein $R^1$ and $R^2$ are each independently hydrogen, an aliphatic group, an aromatic-substituted aliphatic group, an aromatic group, an acyl group, an alkoxycarbonyl group or an aryloxy group, n is a number of 1 to 10, and X is an alkylene group having at least two carbon atoms in the main molecular carbon chain, the molecular chain optionally containing a cycloalkylene group, an aralkylene group, an arylene group or no less than one hetero atom. As examples of the above-mentioned carbonates, there have been proposed polyetheylene glycol polycarbonates having a polyoxyethylene group in the molecular chain and a hydroxyl group or an alkyl group at the molecular terminals. Such carbonates, however, have low mutual solubility with the above-mentioned hydrogenated fluorocarbon (HFC) which is nondestructive to the ozone layer, and therefore it is not appropriate to use them as lubricant oil for refrigerators. Moreover, these carbonates have such drawbacks that they have a high pour point, and that they have high hygroscopicity when they have hydroxyl group at their molecular terminals. Even in view of these drawbacks, these carbonates are not suitable for lubricant oil for refrigerators.

Japanese Patent L-O-P No. 3,865/1971 proposes a polyethylene glycol polycarbonate having a polyoxyethylene group in the molecular chain and a hydroxl group or an alkyl group at the molecular terminals. However, such a carbonate has, as described above, low mutual solubility with hydrogenated fluorocarbon (HFC) which is nondestructive to the ozone layer, and therefore it is not appropriate to use it as lubricant oil for refrigerators. Moreover, the carbonate has such drawbacks that it has a high pour point, and that it has high hygroscopicity when it has a hydroxyl group at its molecular terminals. Even in view of these drawbacks, the carbonate is not suitable for lubricant oil for refrigerators.

Japanese Patent L-O-P No.3,865/1971 also teaches that a polycarbonate may be obtained by allowing 1 or 2 mols of a diol to react with diphenyl carbonate to form 1 or 2 mols of a monoalcohol in a mixture of n mols of the diol and (n-1) mols of diphenyl carbonate. For example, said Japanese Patent L-O-P describes a process for preparing a polycarbonate having a decyl group at the molecular terminals, wherein said monoalcohol is n-decanol, said diol is polyethylene glycol, and the reaction is conducted by heating under a reduced pressure.

Furthermore, in the above-mentioned process, highly reactive diphenyl carbonate is preferably used as a starting carbonate. In addition, diphenyl carbonate is preferably used from the stand point of easy setting of the reaction conditions because of its high boiling point.

In contrast, when dimethyl carbonate or diethyl carbonate which is less reactive and has a low boiling point is used, it is not easy to terminate the molecular terminals substantially only with alkyl by the above-described method. Furthermore, the use of a catalyst is required when such a less reactive carbonate is used as a starting material, but removal of the catalyst having a high boiling point from the reaction products is not easy.

It is, however, industrially and economically very advantageous to use, as starting materials, dimethyl carbonate or diethyl carbonate which are less expensive than diphenyl carbonate.

It has already been known, in general, that a polycarbonate can be obtained by allowing a monoalcohol to react with a carbonate such as dimethyl carbonate.

However, by the prior art process for preparing polycarbonates wherein a polyol instead of a monoalcohol is allowed to react with the carbonate, the remaining unreacted carbonate is distilled off by heating after the reaction, and the catalyst is neutralized with acid, the desired polycarbonate cannot be obtained in a high yield.

The present invention is intended to solve the above-described problems involved in the prior art method, and an object of this invention is to provide lubricant oil compositions having excellent lubricating properties and detergency, and also having high mutual solubility with Freon which is nondestructive to the ozone layer. More in detail, a further object of this invention is to provide lubricant oil compositions capable of being especially suitably used as lubricant oil compositions for refrigerators in which an ozone layer-nondestructive Freon gas is used as a refrigerant.

A still further object of this invention is to provide a novel polyalkylene glycol polycarbonate having a polyoxypropylene group in the molecular chain and an alkyl group and an alkyloxyalkylene group at the molecular terminals.

Another object of this invention is to provide a process for preparing a polyalkylene glycol polycarbonate having molecular terminals substantially composed of hydrocarbon group only and containing almost no remaining catalyst, wherein dimethyl carbonate or diethyl carbonate is employed as a starting material.

Still another object of this invention is to provide processes for preparing specific polyalkylene glycol polycarbonates in a high yield.

SUMMARY OF THE INVENTION

A first lubricant oil composition according to this invention comprises a polyalkylene glycol polycarbonate (oligocarbonate) represented by the general formula [I]

$$R_1\!-\!OCOO\!+\!\!+\!R_2\!\rightarrow_{\!l}\!O\!\rightarrow_{\!m}\!-\!COO\!\rightarrow_{\!n}\!R_1 \qquad [I]$$

wherein $R_1$ is each independently a hydrocarbon group having not greater than 20 carbon atoms and being selected from an aliphatic group, an alicyclic group, an aromatic group and an aromatic-substituted aliphatic group, or an alkyloxyalkylene group (glycol ether group) represented by the general formula $$+\!(R_3\!\rightarrow_{\!p}\!O\!\rightarrow_{\!q}\!R_4$$

($R_3$ is an alkylene group having 2 to 20 carbon atoms, $R_4$ is an aliphatic group, an alicyclic group or an aromatic group each having not greater than 20 carbon atoms, p is an integer of 1 to 100, q is an integer of 1 to 10), $R_2$ is an alkylene group having 2 to 20 carbon atoms, l is an integer of 1 to 100, m is an integer of 1 to 10, and n is an integer of 1 to 100.

The polyalkylene glycol polycarbonates preferably used in the above lubricant oil composition include a novel polyalkylene glycol polycarbonate.

A novel polyalkylene glycol polycarbonate according to this invention is represented by the general formula [I]'

$$R_{11}-OCOO+(R_{12}O)_{m-1}R_{12}O-COO)_n R_{11} \quad [I]'$$

wherein $R_{11}$ is each independently a group selected from an alkyl group having 1 to 6 carbon atoms and an alkyloxyalkylene group represented by the general formula $$+R_{13}O)_q R_{14}$$

($R_{13}$ is an ethylene group or a propylene group, $R_{14}$ is an alkyl group having 1 to 6 carbon atoms, and q is an integer of 1 to 10), $R_{12}$ is a propylene group, m is an integer of 2 to 10, n is an integer of 1 to 10, and 10 to 95 mol % of the molecular terminal groups are occupied by said alkyloxyalkylene group.

A first process according to this invention for preparing a polyalkylene glycol polycarbonate represented by the general formula [V]

$$R_{41}-OCOO+(R_{42}-OCOO)_n R_{41} \quad [V]$$

wherein $R_{41}$ is each independently $R_{21}$ or $R_{31}$, $R_{21}$ is a group selected from an alkyl group having 1 to 6 carbon atoms and an alkyloxyalkylene group of the formula $$+R_{23}O)_q R_{24}$$

($R_{23}$ is an ethylene group or a propylene group, $R_{24}$ is an alkyl group having 1 to 6 carbon atoms, q is an integer of 1 to 10, $R_{31}$ is methyl or ethyl, $R_{42}$ is the same with $R_{22}$, $R_{22}$ is a polypropylene glycol residue represented by $$+C_3H_6O)_a C_3H_6-$$

(a is an integer of 1 to 9), and n is an integer of 1 to 10 comprises the steps of heating under a normal or high pressure (a) a polypropylene glycol represented by the general formula [II]

$$HO-R_{22}-OH \quad [II]$$

wherein $R_{22}$ is as defined above, in the presence or in the absence of (b) a monoalcohol represented by the general formula [III]

$$R_{21}OH \quad [III]$$

wherein $R_{21}$ is as defined above, and in the presence of (c) a carbonate represented by the general formula [IV] and a basic catalyst $$R_{31}-OCOO-R_{31} \quad [IV]$$

wherein $R_{31}$ is each as defined above, said carbonate being used in such an amount that a molecular ratio represented by $m_1/(2m_2+m_3)$ is from 0.6 to 5 wherein $m_1$ is a number of mols of the carbonate, $m_2$ is a number of mols of the polypropylene glycol and $m_3$ is a number of mols of the monoalcohol, while the resultant product of an alcohol represented by the general formula $R_{31}OH$ is being distilled off from the reaction system, thus the reaction being allowed to proceed to a reaction ratio of not less than 95%, said reaction ratio being represented by the following formula represented by the molecular ratio of compounds concerned in the reaction $$100m_4/(2m_2+m_3)$$

wherein $m_4$ is a number of mols of the alcohol represented by $R_{31}OH$, and $m_2$ and $m_3$ are as defined above, distilling off the unreacted carbonate from the reaction system, heating the reaction mixture under a reduced pressure to conduct condensation polymerization, and neutralizing the basic catalyst in the reaction products with acid.

A second lubricant oil composition according to this invention comprises a polyalkylene glycol polycarbonate (polyol carbonate) represented by the general formula [VI]

$$R_5+OCOO-R_6)_j \quad [VI]$$

wherein $R_5$ is a hydrocarbon group having a molecular weight of 85 to 10,000 or a hydrocarbon group containing oxygen and having a molecular weight of 60 to 10,000, j is an integer of 2 to 10, $R_6$ is each independently selected from the group consisting of a hydrocarbon group of an aliphatic group, an alicyclic group, an aromatic group and an aromatic-substituted aliphatic group, and an alkyloxyalkylene group (glycol ether group) represented by the general formula $$+R_7-O)_k R_8$$

($R_7$ is an alkylene group having 2 to 20 carbon atoms, $R_8$ is an aliphatic group, an alicyclic group or an aromatic group each having not greater than 20 carbon atoms, k is an integer of 1 to 10).

A second process according to this invention for preparing a polyalkylene glycol polycarbonate represented by the general formula $$R_{15}+OCOOR_{16})_j$$

wherein $R_{15}$ is an aliphatic hydrocarbon group having 7 to 300 carbon atoms or an aliphatic hydrocarbon group containing an ether bond and having 4 to 300 carbon atoms, $R_{16}$ is an alkyl group having 1 to 20 carbon atoms, and j is an integer of 2 to 8 comprises the steps of heating in the presence of a basic catalyst (a) a polyol represented by the general formula [VII]

$$R_{15}(OH)_j \quad [VII]$$

wherein $R_{15}$ and j are as defined above, and (b) a carbonate represented by the general formula [VIII]

$$R_{16}OCOOR_{16} \quad [VIII]$$

wherein $R_{16}$ is as defined above, the boiling point of $R_{16}OH$ is lower than that of the above-described polyol, said carbonate being used in such an amount that a molecular ratio represented by $m_6/jm_5$ is from 2 to 50 wherein $m_5$ is a number of mols of said polyol represented by the formula [VII], $m_6$ is a number of mols of said carbonate represented by the formula [VIII], and j is as defined above, while the resultant alcohol thus produced is being removed from the reaction system by distillation, thus the reaction being allowed to proceed to a reaction ratio of not less than 95%, removing the above-mentioned basic catalyst, and distilling off the unreacted carbonate from the reaction system.

The first and second lubricant oil compositions according to this invention have excellent lubricating properties and detergency, and their viscosity at low temperature can be easily decreased compared with mineral oil or ester lubricant oil. Accordingly, they can be widely used as industrial gear oil, automotive engine oil, automotive gear oil, lubricant oil for refrigerators including car air conditioners and refrigerators, lubricant oil for fibers and rolling lubricant oil.

The first and second lubricant oil compositions according to this invention are excellent not only in the above-mentioned properties but also in mutual solubility with ozone layer-nondestructive Freon such as Freon R-134a, and therefore they can be used as lubricant oil for refrigerators where ozone layer-nondestructive Freon such as Freon R-134a is employed as a refrigerant.

In the first and second lubricant oil compositions of this invention, there can be used, as lubricant oil for refrigerators, those containing ozone layer-nondestructive Freon such as R-134a in addition to a polyalkylene glycol polycarbonate (oligocarbonate) represented by the general formula [I] described above or a polyalkylene glycol polycarbonate (polyol carbonate) represented by the general formula [VI].

The term "lubricant oil composition" in this specification includes lubricant oil comprising a polyalkylene glycol polycarbonate (oligocarbonate or polyol carbonate) of this invention and other ingredients, and one composed of only a polyalkylene glycol polycarbonate (oligocarbonate or polyol carbonate) of this invention.

DETAILED DESCRIPTION OF THE INVENTION

Figure 1:
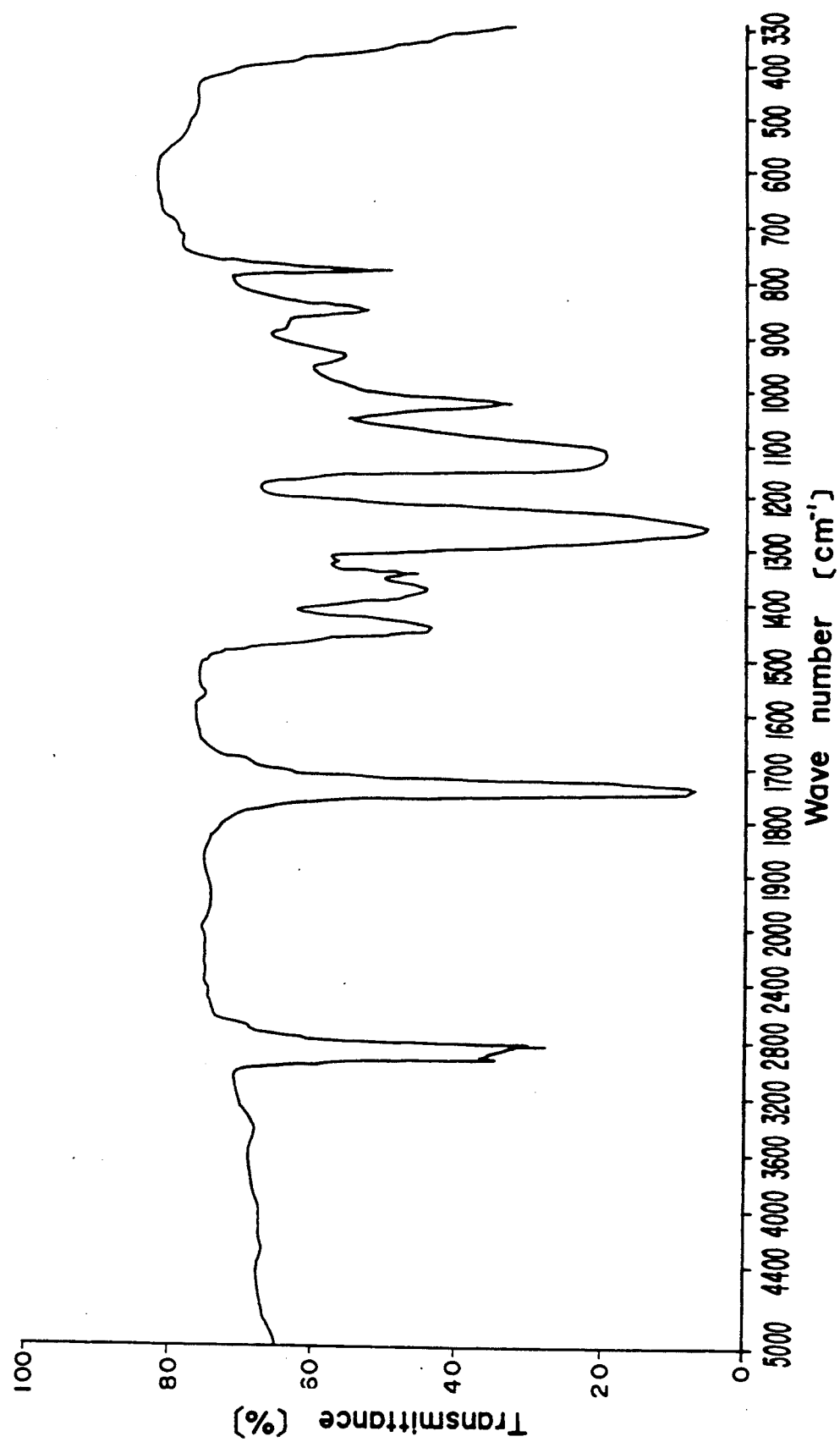
FIG. 1 is a graph showing an IR absorption spectrum of a polyalkylene glycol polycarbonate obtained in Example 1.

The lubricant oil compositions, polyalkylene glycol polycarbonates and processes for preparing them according to this invention are concretely illustrated hereinafter.

First, the first lubricant oil composition of the invention is described below.

The first lubricant oil composition according to this invention is a composition comprising a specific polyalkylene glycol polycarbonate (oligocarbonate) represented by the general formula [I]

$$R_1-OCOO(-(-R_2-)_l O-)_m-COO-)_n R_1 \quad [I]$$

wherein $R_1$ is each independently a hydrocarbon group having not greater than 20 carbon atoms and being selected from an aliphatic group, an alicyclic group, an aromatic group and an aromatic-substituted aliphatic group, or an alkyloxyalkylene (glycol ether group) represented by the general formula $$(-(R_3-)_p O-)_q R_4.$$

Here, concrete examples of an aliphatic hydrocarbon group represented by $R_1$ include methyl, ethyl, propyl, isopropyl, isobutyl, sec-butyl, tert-butyl, pentyl, isopentyl, neopentyl, n-hexyl, isohexyl, n-heptyl, isoheptyl, n-octyl, isooctyl, n-nonyl, isononyl, n-decyl, isodecyl, n-undecyl, isoundecyl, n-dodecyl, isododecyl, n-tridecyl, isotridecyl, n tetradecyl, isotetradecyl, n-pentadecyl, isopentadecyl, n-hexadecyl, isohexadecyl, n-heptadecyl, isoheptadecyl, n octadecyl, isooctadecyl, n-nonyldecyl, isononyldecyl, n-eicosanyl and isoeicosanyl.

Concrete examples of an alicyclic hydrocarbon group represented by $R_1$ include cyclohexyl, 1-cyclohexenyl, methyl- cyclohexyl, dimethylcyclohexyl, decahydronaphtyl and tricyclodecanyl.

Concrete examples of an aromatic hydrocarbon group represented by $R_1$ include phenyl, o-tolyl, p-tolyl, m-tolyl, 2,4-xylyl, mesityl and 1-naphtyl.

Concrete examples of an aromatic-substituted aliphatic hydrocarbon group represented by $R_1$ include benzyl, methylbenzyl, β-phenylethyl (phenethyl), 1-phenylethyl, 1-methyl-1-phenylethyl, p-methylbenzyl, styryl and cinnamyl.

In the above-described general formula representing an alkyloxyalkylene group (glycol ether group), $R_3$ is an alkylene group having 2 to 20 carbon atoms, $R_4$ is a hydrocarbon group of an aliphatic group, an alicyclic group or an aromatic group each having not greater than 20 carbon atoms, p is an integer of 1 to 100, and q is an integer of 1 to 10.

Concrete examples of an alkylene group represented by $R_3$ described above include an ethylene group, a propylene group, a butylene group, an amylene group, an isoamylene group, a hexene group, an isopropylene group, an isobutylene group, a styrene group, an α-methylstyrene group and an α, α-dimethyl styrene group.

Concrete examples of an aliphatic hydrocarbon group, an alicyclic hydrocarbon group and an aromatic hydrocarbon group for $R_4$ described above include the same groups as the aliphatic hydrocarbon group, the alicyclic hydrocarbon group and the aromatic hydrocarbon group mentioned for $R_1$ described above.

$R_2$ in the above-described formula is an alkylene group, and concrete examples of the alkylene group include the same groups as the alkylene group mentioned for $R_3$ described above.

N mentioned above is an integer of 1 to 100. In the present invention, the polyalkylene glycol polycarbonate represented by the general formula [I] may contain a polyalkylene glycol polycarbonate represented by the general formula [I] in which n=0, though the polycarbonate with n equal to 0 is not included in the compounds of the present invention.

Polyalkylene glycol polycarbonates preferably used in this invention include those represented by the general formulas

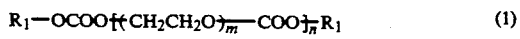 (1)

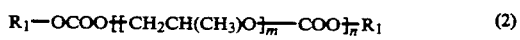 (2)

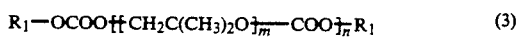 (3)

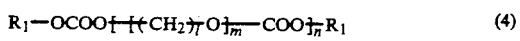 (4)

 (5)

 (6)

and

 (7)

wherein $R_{11}$ is each independently a group selected from an alkyl group having 1 to 6 carbon atoms and an alkyloxyalkylene group (glycol ether group) represented by the general formula

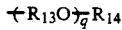

($R_{13}$ is an ethylene group or a propylene group, $R_{14}$ is an alkyl group having 1 to 6 carbon atoms, q is an integer of 1 to 10), $R_{12}$ is a propylene group, m is an integer of 2 to 10, n is an integer of 1 to 10, and 10 to 95 mol % of the molecular terminal groups of the polyalkylene glycol polycarbonate represented by the general formula [I]' are occupied by said alkyloxyalkylene group. Of these compounds, especially preferred are polyalkylene glycol polycarbonates represented by the above-described general formulas (1), (2), (4) and (7). When polyalkylene glycol polycarbonates having a low viscosity at low temperature is desired, there should be selected those having a branched type of carbon skeleton. Moreover, there may be selected polyalkylene glycol polycarbonates having values of m and n in the above-mentioned formulas set in a range necessary for ensuring a viscosity suitable for use.

The above-described polyalkylene glycol polycarbonate represented by the general formula [I] can be prepared by ester interchange reaction between at least one of monohydric alcohols represented by the following general formula [A] and at least one of oxyalkylene glycols represented by the following general formula [B], in the presence of a carbonate in an excessive amount:

$R_1-OH$ [A]

wherein $R_1$ is the same with $R_1$ in the above-mentioned formula [I]; and

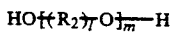 [B]

wherein $R_2$, l and m are the same with $R_2$, l and m, respectively in the above-mentioned general formula [I].

In the above-described process for preparing a polyalkylene glycol polycarbonate, the average molecular weight of the polyalkylene glycol polycarbonate can be easily controlled by selecting the oxyalkylene glycol and the monohydric alcohol and setting molecular ratio of the two compounds. The above-described process therefore can easily produces a polyalkylene glycol polycarbonate having a viscosity which may vary widely to cope with use.

Furthermore, in the above-described process for preparing polyalkylene glycol polycarbonates, the carbonate ester bond is introduced by ester interchange in the presence of an excessive amount of a carbonate of an alcohol having a relatively low boiling point, and therefore the process does not require the use of a highly toxic gas, as is the case with the phosgene process. The process of the invention is therefore advantageous from the standpoint of safety.

The thus obtained polyalkylene glycol polycarbonates have excellent lubricating properties, low hygroscopicity and good detergency compared with glycol ethers, and therefore they can be used as industrial gear oil, automotive engine oil, automotive gear oil, lubricant oil for refrigerators including car air conditioners and refrigerators, lubricant oil for rolling and lubricant oil for fibers.

The first lubricant oil composition according to the present invention comprises a polyalkylene glycol polycarbonate in an amount of 1 to 100 parts by weight based on 100 parts by weight of the total lubricant composition. As a result, the polyalkylene glycol polycarbonate can be used solely as a lubricant oil, and it can also be used in combination with other components to form a lubricant oil.

For example, in the case of using the first lubricant oil composition of this invention as industrial gear oil, automotive engine oil and automotive gear oil, the polyalkylene glycol polycarbonate may be incorporated with other usable components including mineral oil such as neutral oil and bright stock. It may also be incorporated with an α-olefin oligomer such as liquid polybutene and isooctyl adipate, di-isooctyl sebacate and dilauryl sebacate, and vegetable oil. In this invention, the lubricant oil composition may also comprise such known additives for lubricant oil, which is described in a book entitled "Additives for Petroleum Products" edited by Toshio Sakurai (published in 1974 by Saiwai Shobo) and the like, as dispersants for cleaning, antioxidants, load-resistant additives, oiliness improvers and pour point depressants so long as the incorporation of the additives does not impair the object of the invention.

Furthermore, in the case of using the first lubricant oil composition of this invention as lubricant oil for refrigerators, the polyalkylene glycol polycarbonate may be incorporated with other usable components including glycol ethers and mineral oil such as neutral oil and bright stock. It may also be incorporated with an α-olefin oligomer such as liquid polybutene and liquid decene oligomer, a carboxylic acid ester such as di-isooctyl adipate, di-isooctyl sebacate and dilauryl sebacate, and vegetable oil. In the case of using the first lubricant oil composition of the invention for refrigerators where HFC such as Freon R-134a (tetrafluoroethane) is specifically employed as a refrigerant gas nondestructive to the ozone layer, usable other additives are limited to glycol ethers and carboxyic acid esters when the mutual solubility with the refrigerant gas is considered. The addition amount of these additives, however, is required not to become greater than 60% by weight of the entire lubricant oil composition from the standpoint of not deteriorating heat resistance, mutual solubility with Freon R-134a and hygroscopicity resistance. Moreover, the lubricant oil composition may contain known lubricant oil additives as described above. Furthermore, the lubricant oil composition for refrigerators may also contain ozone layer-nondestructive Freon such as Freon R-134a.

When there is used a polyalkylene glycol polycarbonate, which the first lubricant oil composition of the present invention comprises, as lubricant oil for rolling, machining oil and lubricant oil for fibers, the polyalkylene glycol polycarbonate may be used in a conventionally employed form of an aqueous emulsion prepared with a suitable emulsifier.

A novel polyalkylene glycol polycarbonate according to the present invention is illustrated hereinafter.

The novel polyalkylene glycol polycarbonate according to this invention is included in polyalkylene glycol polycarbonates represented by the above-mentioned general formula [I], and is a polycarbonate which is preferably used in the lubricant oil composition according to the present invention and which is represented by the general formula [I]′

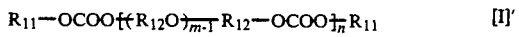  [I]′ wherein $R_{11}$, which is a molecular terminal group, is each independently a group selected from an alkyl group having 1 to 6 carbon atoms and an alkyloxyalkylene group represented by the general formula

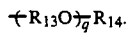

Concrete examples of $R_{11}$ described above include methyl, ethyl, propyl, butyl and hexyl.

In the above-described general formula representing an alkyloxyalkylene group, $R_{13}$ is an ethylene group or propylene group, $R_{14}$ is an alkyl group having 1 to 6 carbon atoms, and q is an integer of 1 to 10, preferably 1 to 4.

Concrete examples of an alkyl group for $R_{14}$ described above include methyl, ethyl, propyl, butyl and hexyl.

In the general formula [I]′ described above, $R_{12}$ is a propylene group, m is an integer of 2 to 10, preferably 2 to 5, and n is an integer of 1 to 10, preferably 1 to 3.

In the present invention, a polyalkylene glycol polycarbonate represented by the general formula [I]′ may contain as a mixture component a polyalkylene glycol polycarbonate represented by the general formula [I]′ with n=0, though the polycarbonate with n equal to 0 is not included in the copounds of the present invention, and the apparent average value of n in the general formula [I]′ is usually 0.5 to 10, preferably 0.7 to 3.

The above-mentioned alkyloxyalkylene group occupies the molecular terminal group of the polyalkylene glycol polycarbonate of the present invention in an amount of 10 to 95 mol %, preferably 20 to 90 mol %. Accordingly, the polyalkylene glycol polycarbonate of the present invention has, as molecular terminal group $R_{11}$, an alkyl group having 1 to 6 carbon atoms and an alkyloxyalkylene group as described above.

Such a polycarbonate is especially excellent in mutual solubility with hydrogenated fluorocarbon compounds nondestructive to the ozone layer, and therefore it can be appropriately used as a lubricant oil for refrigerators. Moreover, the polycarbonate has an advantageous point that it has a low pour point and low hygroscopicity.

The novel polyalkylene glycol polycarbonate according to the present invention as described above can be prepared, for example, by a novel process comprising heating a polypropylene glycol represented by the general formula [II]

  [II]

under a normal or high pressure in the presence or in the absence of a monoalcohol represented by the general formula

  [III]

and in the presence of a carbonate represented by the general formula [IV]

  [IV]

and a basic catalyst, while the resultant product of an alcohol represented by the general formula $R_{31}OH$ is being distilled off from the reaction system, thus the reaction being allowed to proceed to a reaction ratio of not less than 95%, said reaction ratio being represented by the following formula represented by the molecular ratio of compounds concerned in the reaction

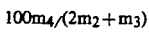

($m_4$ is a number of mols of $R_{31}OH$, $m_2$ is a number of mols of the polypropylene glycol, $m_3$ is a number of mols of the monoalcohol);

distilling off the above-mentioned carbonate which is unreacted from the reaction system;

heating the thus obtained reaction mixture under a reduced pressure to effect condensation polymerization; and neutralizing the basic catalyst remaining in the thus obtained reaction products to obtain a polyalkylene glycol polycarbonate represented by the general formula [V]

  [V]

wherein $R_{41}$ is each independently the same with $R_{21}$ or $R_{31}$ described above, $R_{42}$ is the same with $R_{22}$ described above, and n is an integer of 1 to 10.

In the general formula [V], if $R_{11}$ and

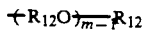

are substituted for of $R_{41}$ and $R_{42}$, respectively, the general formula [I]' can be obtained.

$R_{22}$ in the general formula [II] described above and representing a polypropylene glycol is a polypropylene glycol residue represented by

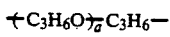

(a is an integer of 1 to 9).

$R_{21}$ in the general formula [III] described above and representing a monoalcohol is an alkyl group having 1 to 6 carbon atoms or an alkyloxyalkylene group represented by the general formula

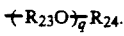

Concrete examples of an alkyl group for $R_{21}$ described above include methyl, ethyl, propyl, butyl, pentyl and hexyl.

In the above general formula representing an alkyloxyalkylene group, $R_{23}$ is an ethylene group or a propylene group, and $R_{24}$ is an alkyl group having 1 to 6 carbon atoms, with q being an integer of 1 to 10.

Concrete examples of an alkyl group for R24 described above include methyl, ethyl, propyl, butyl and hexyl.

Preferable examples of monoalcohols represented by the above-described general formula [III] include monoalkyl ethers of ethylene glycol, diethylene glycol, triethylene glycol, polyethylene glycol, etc., and monoalkyl ethers of propylene glycol, dipropylene glycol, tripropylene glycol and polypropylene glycol.

The polypropylene glycol represented by the general formula [II] and the monoalcohol represented by the general formula [III] are used in a molecular ratio (polypropylene glycol)/monoalcohol of 0 to 2.

The carbonate represented by the general formula [IV] has $R_{31}$ which is each independently methyl or ethyl.

Dimethyl carbonate or diethyl carbonate is used as the carbonate represented by the above-described general formula [IV]. Dimethyl carbonate or diethyl carbonate is used in a molecular ratio $[m_1/(2m_2+m_3)]$ of 0.6 to 5, preferably 1 to 3, wherein $m_1$ is a number of mols of dimethyl carbonate or diethyl carbonate, $m_2$ is a number of mols of the polypropylene glycol represented by the general formula [II], and $m_3$ is a number of mols of the monoalcohol.

Though the above-mentioned molecular ratio is theoretically 0.5, the molecular terminal hydroxyl group remains when dimethyl carbonate or diethyl carbonate is not used excessively. When the molecular ratio becomes too high, the process becomes not economical.

When the reaction is conducted in a reaction vessel having a distillation column, the formed alcohol of the formula $R_{31}OH$ can be efficiently distilled off. The above-described carbonate of the formula [IV] may be placed in the reaction vessel in a total amount at the initial stage of the reaction, or it may be placed in a partial amount at the initial stage, followed by intermittent or continuous addition during the reaction.

According to the process of the present invention, the reaction is carried out in two steps. The first step in the process of the invention, as described above, comprises placing a polypropylene glycol (monoalcohol if necessary) and a carbonate in a reaction vessel, heating the mixture under a normal or high pressure in the presence of a basic catalyst while the formed alcohol is being removed from the reaction system by distillation to achieve carbonating reaction to a reaction ratio of not less than 95%, and removing the above-mentioned carbonate which is unreacted from the reaction system by distillation. A reaction ratio of not less than 95% signifies that the reaction is allowed to proceed until the above mentioned produced alcohol is formed in an amount of not less than $0.95 \times (2m_2+m_3)$ mols ($m_2$ is a number of mols of the polypropylene glycol represented by the above-described general formula [II], and $m_3$ is a number of mols of the monoalcohol represented by the above-described general formula [III]).

The second step in the process of the invention comprises heating the thus obtained reaction mixture under a reduced pressure while a carbonate compound produced by carbonate interchange reaction is being removed from the reaction system by distillation, thus condensation polymerization being conducted, and neutralizing the basic catalyst with acid.

Preferable basic catalysts used herein include alkali metal hydroxides such as sodium hydroxide and potassium hydroxide, carbonates and hydrogencarbonates of alkali metals such as sodium carbonate and sodium hydrogencarbonate, alkali metal alcoholates such as sodium methoxide, potassium methoxide, lithium methoxide and cesium methoxide, and alkali metal compounds such as sodium hydride and sodium amide. Of these compounds, alkali metal alcoholates are particularly preferable. In addition, there can also be employed other compounds, for example, alkaline earth metal compounds such as magnesium hydroxide and calcium hydroxide, and organic amino compounds such as trimethylamine, triethylamine, imidazole and tetramethylammonium hydroxide. These catalysts are used in a molecular ratio (number of mols of catalyst)/$(2m_2+m_3)$ of usually $10^{-1}$ to $10^{-7}$, preferably $10^{-2}$ to $10^{-5}$ ($m_2$ and $m_3$ are as defined above).

In the process of the present invention, the first step reaction is, as described above, carbonating reaction, and the second step reaction is carbonate interchange reaction. The carbonating reaction is conducted under a pressure of usually 30 kg/cm$^2$, preferably normal pressure to 10 kg/cm$^2$ and in the temperature range of 50° C. to 300° C., preferably 60° C. to 200° C. The reaction time is in the range of usually 0.5 to 200 hours, preferably 1 to 100 hours. The carbonate interchange reaction is carried out under a reduced pressure of usually 400 to 1 mm Hg, preferably 200 to 5 mmHg and in the temperature range of 50° to 300° C., preferably 60° to 200° C. The reaction time is usually 0.1 to 100 hours, preferably 0.2 to 50 hours.

Solid acids, inorganic acids or organic acids are used for neutralizing the catalyst after the reaction. For example, acids used here include sulfonic acid type ion exchange resins, hydrogencarbonate, ammonium carbonate, ammonium chloride, hydrochloric acid, sulfuric acid, phosphoric acid, acetic acid and phenol. Of these acids, preferably used are weak acids such as sulfonic acid type ion exchange resins, hydrogencarbonate, ammonium carbonate and ammonium chloride, and neutralization is performed with an aqueous solution of a weak acid.

According to the process of the present invention, there can be obtained polyalkylene glycol polycarbonates having molecular terminals substantially composed of only hydrocarbon group. That is, the polyalkylene carbonate represented by the above-described general formula [V] has molecular terminals $R_{41}$ each independently being the same with $R_{21}$ or $R_{31}$, and n being an integer of 1 to 10.

The polyalkylene glycol polycarbonate represented by the general formula [V] may contain, as a mixture component, a polyalkylene glycol polycarbonate represented by the general formula [V] wherein n is 0. The average value of n in the general formula [V] is usually in the range of 0.5 to 10.

The thus obtained polyalkylene glycol polycarbonate may be purified, if necessary, by treating it with adsorbents such as activated clay and activated carbon or by washing it with water to be freed from a trace amount of impurities. Such a treatment removes a trace amount of ionic compounds and polar compounds, and the thus obtained polyalkylene glycol polycarbonate can be stably stored.

In the case of using dimethyl carbonate as a carbonate in the above-described first step reaction in the process of the present invention, a solvent for forming an azeotropic mixture such as cyclohexane, benzene and hexane may be added in the reaction system before starting the reaction, and methanol produced may be removed from the reaction system as an azeotropic mixture with the solvent instead of removing the methanol as an azeotropic mixture with dimethyl carbonate. The solvent for forming an azeotropic mixture is usually used in an amount of 5 to 100 parts by weight based on 100 parts by weight of dimethyl carbonate.

The above described procedure removes methanol as an azeotropic mixture with the above-mentioned solvent for forming an azeotropic mixture from the reaction system, and unreacted dimethyl carbonate is recovered from the reaction mixture after completion of the reaction. The recovery yield can therefore be increased.

There is another procedure wherein methanol is recovered as an azeotropic mixture with dimethyl carbonate as described above, the above-mentioned solvent for forming an azeotropic mixture is added to the azeotropic mixture, methanol is removed as an azeotropic mixture with the solvent from dimethyl carbonate, and dimethyl carbonate is recovered.

A second lubricant oil composition according to this invention comprises a polyalkylene glycol polycarbonate (polyol carbonate) represented by the general formula [VI]

$$R_5 \text{—}(OCOOR_6)_j \qquad [VI]$$

wherein $R_5$ is hydrocarbon group having a molecular weight of 85 to 10,000 or hydrocarbon group containing oxygen and having a molecular weight of 60 to 10,000, j is an integer of 2 to 10, $R_6$ is each independently selected from the group consisting of a hydrocarbon group of an aliphatic group, an alicyclic group, an aromatic group and an aromatic-substituted aliphatic group, and an alkyloxyalkylene group (glycol ether group) represented by the general formula $$\text{—}(R_7\text{—}O)_k R_8$$

($R_7$ is an alkylene group having 2 to 20 carbon atoms, $R_8$ is an aliphatic group, an alicyclic group or an aromatic group each having not greater than 20 carbon atoms, k is an integer of 1 to 10).

Concrete examples of $R_5$ include ethylene glycol residue having a structure obtained by substantially removing a hydroxyl group from triethylene glycol, tetraethylene glycol, pentaethylene glycol, hexaethylene glycol or polyethylene glycol, propylene glycol residue having a structure obtained by substantially removing a hydroxyl group from dipropylene glycol, tripropylene glycol, tetrapropylene glycol, pentapropylene glycol, hexapropylene glycol or polypropylene glycol, residue having a structure obtained by substantially removing a hydroxyl group from an oxyethylene-oxypropylene copolymer, and polyol residue having a structure obtained by substantially removing a hydroxyl group from a polyol such as dipentaerythritol, glucose and fructose. In the case of lubricant oil for refrigerators using, as a refrigerant, such Freon gas nondestructive to the ozone layer as Freon R-134a, $R_5$ is ethylene glycol residue or propylene glycol residue as described above, preferably ethylene glycol residue or propylene glycol residue having a molecular weight of 200 to 2,000, particularly preferably propylene glycol residue having a molecular weight of 200 to 2,000.

Concrete examples of an aliphatic hydrocarbon group represented by $R_6$ described above include methyl, ethyl, n-propyl, isopropyl, n-butyl, isobutyl, sec-butyl, tert butyl, pentyl, isopentyl, neopentyl, n-hexyl, isohexyl, n-heptyl, isoheptyl, n-octyl, isooctyl, n-nonyl, isononyl, n-decyl, isodecyl, n-undecyl, isoundecyl, n-dodecyl, isododecyl, n-tridecyl, isotridecyl, n-tetradecyl, isotetradecyl, n-pentadecyl, isopentadecyl, n-hexadecyl, isohexadecyl, n-heptadecyl, iso-heptadecyl, n-octadecyl, iso-octadecyl, n-nonyldecyl, isononyldecyl, n-eicosanyl and iso-eicosanyl.

Concrete examples of an alicyclic group represented by $R_6$ include cyclohexyl, 1-cyclohexenyl, methylcyclohexyl, dimethylcyclohexyl, decahydronaphtyl and tricyclodecanyl.

Concrete examples of an aromatic hydrocarbon group represented by $R_6$ include phenyl, o-tolyl, p-tolyl, m-tolyl, 2,4-xylyl, mesityl and 1-naphtyl.

Concrete examples of an aromatic-substituted aliphatic hydrocarbon group represented by $R_6$ include benzyl, methylbenzyl, $\beta$-phenylethyl (phenethyl), 1-phenylethyl, 1-methyl-1-phenylethyl, p-methylbenzyl, styryl and cinnamyl.

In the above-described general formula representing glycol ethers, $R_7$ is an alkylene group having 2 to 20 carbon atoms, $R_8$ is an aliphatic group, an alicyclic group or an aromatic group each having not greater than 20 carbon atoms, and k is an integer of 1 to 10.

Concrete examples of an alkylene hydrocarbon group represented by $R_7$ include an ethylene group, a propylene group, a butylene group, an amylene group, an isoamylene group, a hexene group, an isopropylene group, an isobutylene group, a styrene group, an $\alpha$-methylstyrene group and an $\alpha,\alpha$-dimethyl styrene group.

Concrete examples of an aliphatic group, an alicyclic group and an aromatic group for $R_8$ include those mentioned for $R_6$.

Concrete examples of a glycol ether group represented by the above-described general formula include an ethylene glycol monomethyl ether group, a diethylene glycol mono-n-butyl ether group, a triethylene glycol monoethyl ether group, a propylene glycol monomethyl ether group, a dipropylene glycol monoethyl ether group and a tripropylene glycol mono-n-butyl ether group.

In the case of lubricant oil for refrigerators using such a Freon gas nondestructive to the ozone layer as Freon R-134a for a refrigerant, $R_6$ is preferably a lower alkyl group such as methyl, ethyl, isopropyl and n-butyl, and an alkylene glycol monoalkyl ether group such as an ethylene glycol monomethyl ether group, a diethylene glycol monomethyl ether group, a triethylene glycol monomethyl ether group, a propylene glycol monomethyl ether group, a dipropylene glycol monoethyl group and a tripropylene glycol mono-n-butyl ether group.

Examples of polyalkylene glycol polycarbonates preferably used in this invention are listed below.

(1) $CH_3-OCO(-OC_3H_6)_n OCOO-CH_3$ (2) $C_2H_5-OCO(-OC_3H_6)_n OCOO-C_2H_5$ (3) $(CH_3)_2CH-OCO(-OC_3H_6)_n OCOO-CH(CH_3)_2$ (4) $CH_3-OCO(-OC_2H_4)_n OCOO-CH_3$ (5) $C_2H_5-OCO(-OC_2H_4)_n OCOO-C_2H_5$ (6) $(CH_3)_2CH-OCO(-OC_2H_4)_n OCOO-CH(CH_3)_2$ (7) $CH_3-OCO(-OC_6H_{12})_n OCOO-CH_3$ (8) $C_2H_5-OCO(-OC_6H_{12})_n OCOO-C_2H_5$ (9) $R-OCO(-OC_3H_6)_n OCOO-R$
   $(R = -CH_2CH_2OCH_3)$

(10) $R-OCO(-OC_2H_4)_n OCOO-R$
   $(R = -C_3H_6OCH_3)$

(11) $R-OCO(-OC_3H_6)_n OCOO-R$
   $(R = -C_3H_6OCH_3)$

The polyalkylene glycol polycarbonates represented by the general formula [VI] and as described above can be prepared, for example, by ester interchange reaction between a polyol and an excessive amount of an alcohol carbonate ester having a relatively low boiling point, with activities of a basic catalyst.

When the terminal group $R_6$ is a glycol monoether group or a hydrocarbon group having a relatively large molecular weight, the polyalkylene glycol polycarbonate may be obtained either by conducting ester interchange reaction in the presence of a suitable amount of a monohydric alcohol ($R_6OH$) in the above-described reaction, or by further conducting ester interchange reaction in the presence of an excessive amount of $R_6OH$ after the above-described reaction, or by conducting direct ester interchange reaction with an excessive amount of an asymmetric carbonate of the formula $R_5-OCOO-R_6$ ($R_5$ is a lower alkyl group such as $-CH_3$, $-C_2H_5$ and -isopropyl, or an aromatic group having a low molecular weight such as $C_6H_5-$).

In the process of the present invention, the carbonate ester is placed in an amount of preferably 1.5 to 50 mols per mol of an alcoholic hydroxyl group. When the carbonate ester is placed in an amount in the above-mentioned range, a polyalkylene glycol polycarbonate represented by the above-described general formula [VI] is obtained in a high yield, and the process is economical due to a good yield thereof per reaction vessel. Moreover, such a process is desirable from the standpoint of safety because it does not require a highly toxic gas as is the case with the phosgene process.

In the process of the present invention, the average molecular weight of the polyalkylene glycol polyol can be controlled mainly by suitably selecting a polyol such as a polyoxyalkylene glycol. Accordingly, the process can easily respond to setting a viscosity of the polyalkylene glycol polycarbonate which may be changed widely to cope with the use.

The second lubricant oil composition according to the present invention comprises a polyalkylene glycol polycarbonate in an amount of 1 to 100 parts by weight based on 100 parts by weight of the total lubricant oil composition. As a result, the polyalkylene glycol polycarbonate can be used solely as lubricant oil, and it can also be used in combination with other components to form lubricant oil.

For example, in the case of using the second lubricant oil composition of this invention as industrial gear oil, automotive engine oil and automotive gear oil, the polyalkylene glycol polycarbonate may be incorporated with other usable components as described in the first lubricant oil composition of the invention.

In the case of using the second lubricant oil composition of this invention, other usable components as described in the first lubricant oil composition may be incorporated.

Especially, in the case of lubricant oil for refrigerators where HFC such as Freon R-134a (tetrafluoroethane) is used as a refrigerant gas nondestructive to the ozone layer, usable other additives are restricted to glycol ethers and carboxylic acid esters due to the mutual solubility. The addition amount thereof, however, is required to be not greater than 60% by weight of the entire lubricant oil composition from the standpoint of not deteriorating heat resistance, mutual solubility with Freon R-134a and hygroscopicity resistance. Moreover, the lubricant oil composition may contain known lubricant oil additives as described above. Furthermore, the lubricant oil composition for refrigerators may also contain ozone layer-nondestructive Freon such as Freon R-134a.

In the case of using a polyalkylene glycol polycarbonate, which the second lubricant oil composition of the present invention comprises, as lubricant oil for rolling, machining oil, lubricant oil for fibers, etc., the polyalkylene glycol polycarbonate may be employed as an aqueous emulsion, the use of emulsion being similar to that in the first lubricant oil composition as described above, conventionally prepared with a suitable emulsifier.

Furthermore, among polyalkylene glycol polycarbonates represented by the above-described general formula [VI], a polyalkylene glycol polycarbonate represented by the general formula [IX]

$$R_{15}(-OCOO-R_{16})_j \qquad [IX]$$

wherein $R_{15}$ is an aliphatic hydrocarbon group having 7 to 300 carbon atoms or an aliphatic hydrocarbon group containing an ether bond and having 4 to 300 carbon atoms, $R_{16}$ is an alkyl group having 1 to 20 carbon atoms, and j is an integer of 2 to 8, can be prepared by a novel process comprising the steps of heating in the presence of a basic catalyst
(a) a polyol represented by the general formula [VII]

$$R_{15}(OH)_j \quad [VII]$$

wherein $R_{15}$ and j are as defined above, and
(b) a carbonate represented by the general formula [VIII]

$$R_{16}-OCOO-R_{16} \quad [VIII]$$

wherein $R_{16}$ is as defined above, and the boiling point of $R_{16}OH$ is lower than that of the above-described polyol, said carbonate being used in such an amount that a molecular ratio represented by $m_6/jm_5$ is from 2 to 50 wherein $m_5$ is a number of mols of said polyol represented by the general formula [VII], $m_6$ is a number of mols of said carbonate represented by the formula [VIII], and j is as defined above, while the resultant alcohol thus produced is removed from the reaction system by distillation, thus the reaction being allowed to proceed to a reaction ratio of not less than 95% (though the reaction can be conducted in an air atmosphere, the reaction vessel is preferably purged with nitrogen during the reaction);
removing the above-mentioned basic catalyst, and
distilling off the unreacted carbonate from the reaction system for removal.

Concrete examples of a polyalkylene glycol polycarbonate represented by the general formula [IX] include novel compounds described below:

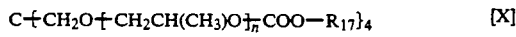

$$C+CH_2O+CH_2CH(CH_3)O+_n COO-R_{17}\}_4 \quad [X]$$

wherein $R_{17}$ is each independently a hydrocarbon group having not greater than 30 carbon atoms or a hydrocarbon group having ether bond and also having 2 to 30 carbon atoms, and the average value of n is 1 to 12.

The hydrocarbon group represented by $R_{17}$ in the above formula [X] is an aliphatic hydrocarbon group, an alicyclic hydrocarbon group, an aromatic hydrocarbon group, an aromatic-substituted aliphatic hydrocarbon group or a glycol ether group represented by the general formula

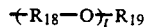

$$+R_{18}-O+_t R_{19}$$

wherein $R_{18}$ is an alkylene group having 2 to 3 carbon atoms, $R_{19}$ is a hydrocarbon group having not greater than 28 carbon atoms, and t is an integer of 1 to 20.

Concrete examples of an aliphatic hydrocarbon group represented by $R_{17}$ include methyl, ethyl, n-propyl, isopropyl, n-butyl, isobutyl, sec-butyl, tert-butyl, pentyl, isopentyl, neopentyl, n-hexyl, 2,3-dimethylbutyl, isohexyl, n-heptyl, isoheptyl, n-octyl, 2-ethylhexyl, isooctyl, n-nonyl, isononyl, n-decyl, isodecyl, n-undecyl, isoundecyl, n-dodecyl, isododecyl, n-tridecyl, isotridecyl, n-tetradecyl, isotetradecyl, n-pentadecyl, isopentadecyl, n-hexadecyl, isohexadecyl, n-heptadecyl, isoheptadecyl, n-octadecyl, isooctadecyl, n-nonyldecyl, isononyldecyl, n-eicosanyl, isoeicosanyl, 2-ethylhexyl and 2-(4-methylpentyl)).

Concrete examples of an alicyclic hydrocarbon group represented by $R_{17}$ include cyclohexyl, 1-cyclohexenyl, methylcyclohexyl, dimethylcyclohexyl, decahydronaphtyl and tricyclodecanyl.

Concrete examples of an aromatic hydrocarbon group represented by $R_{17}$ include phenyl, o-tolyl, p-tolyl, m-tolyl, 2,4-xylyl, mesityl and 1-naphtyl.

Concrete examples of an aromatic-substituted aliphatic hydrocarbon group represented by $R_{17}$ include benzyl, methylbenzyl, $\beta$-phenylethyl (phenethyl), 1-phenylethyl, 1-methyl-1-phenylethyl, p-methylbenzyl, styryl and cinnamyl.

Concrete examples of an alkylene group represented by $R_{18}$ include an ethylene group, a propylene group and an isopropylene group.

Examples of a hydrocarbon group represented by $R_{19}$ include an aliphatic hydrocarbon group, an alicyclic hydrocarbon group and an aromatic hydrocarbon group. Concrete examples of these groups include those mentioned above as concrete examples for $R_{17}$.

Concrete examples of a glycol ether group represented by the above-described general formula include an ethylene glycol monomethyl ether group, an ethylene glycol monobutyl ether group, a diethylene glycol mono-n-butyl ether group, a triethylene glycol monoethyl ether group, a propylene glycol monomethyl ether group, a propylene glycol monobutyl ether group, a dipropylene glycol monoethyl ether group and a tripropylene glycol mono-n-butyl ether group.

An example of a polyalkylene glycol polycarbonate represented by the above mentioned formula [X] is described below:

$$C+CH_2O+CH_2CH(CH_3)O+_n COO-CH_3\}_4$$

wherein the average value of n is 1 to 2.

Though preferable concrete examples of polyols represented by the above-described general formula [VII] preferably include diethylene glycol, triethylene glycol, tetraethylene glycol, polyethylene glycol, dipropylene glycol, tripropylene glycol, polypropylene glycol, a diol obtained by copolymerization of ethylene oxide with propylene oxide, pentaerythritol, dipentaerythritol, a polyol composed of a product obtained by reaction between pentaerythritol or dipentaerythritol, and ethylene oxide or propylene oxide, and a polyol composed of a product obtained by reaction between propylene oxide or ethylene oxide, and hydroxymethylethylene oxide or glycerin; dibutylene glycol, tributylene glycol, polybutylene glycol, etc. may also be employed.

Concrete examples of carbonates represented by the above-described general formula [VIII] preferably include dimethyl carbonate, diethyl carbonate, dipropyl carbonate, dibutyl carbonate, dihexyl carbonate, dioctyl carbonate and dicyclohexyl carbonate.

In the present invention, since carbonating reaction is allowed to proceed while the alcohol formed by the carbonating reaction is being removed from the reaction system by distillation, the alcohol formed by the reaction, that is an alcohol represented by $R_{16}OH$ is required to have a boiling point lower than that of the above-mentioned polyol.

As described above, the carbonate is used in such an amount that a molecular ratio represented by $m_6/jm_5$ is from 2 to 50 ($m_5$ and $m_6$ are as defined above) of 2 to 50. By controlling the amount of the carbonate used herein as described above, there can be inhibited formation of the polycarbonate having a high polymerization degree.

In the process of the present invention, the reaction is conducted by placing the above-mentioned polyol and carbonate in a reaction vessel, heating the mixture in the presence of a basic catalyst, removing an alcohol thus produced from the reaction system by distillation, thus the reaction ratio becoming not less than 95%, removing the above-mentioned basic catalyst, and distilling off the unreacted carbonate from the reaction system. The reaction ratio of not less than 95% signifies that the reaction is allowed to proceed until the above-described alcohol is formed in at least 0.95 times as much an amount in mols as $jm_5$.

Preferable basic catalysts used herein include alkali metal hydroxides such as sodium hydroxide and potassium hydroxide, carbonates and hydrogencarbonates of alkali metals such as sodium carbonate and sodium hydrogencarbonate, alkali metal alcoholates such as sodium methoxide, potassium methoxide, lithium methoxide and cesium methoxide, and alkaline metal compounds such as sodium hydride and sodium amide. Of these compounds, alkali metal alcoholates are particularly preferable. In addition, there can be also employed alkaline earth metal compounds such as magnesium hydroxide and calcium hydroxide, and organic amino compounds such as trimethylamine, triethylamine, imidazole and tetramethyl ammonium hydroxide. These catalysts are used in a molecular ratio (number of mols of catalyst)/jm5 of usually $10^{-1}$ to $10^{-7}$, preferably $10^{-2}$ to $10^{-5}$.

In the process of the present invention, the reaction is carried out in the temperature range of usually 50° C. to 300° C., preferably 60° C. to 200° C., and the reaction time is in the range of usually 0.5 to 200 hours, preferably 1 to 100 hours.

The catalyst is removed after the reaction by rinsing with water or neutralizing with acid. Acids used here include solid acids such as sulfonic acid type ion exchange resins, inorganic acids such as hydrogencarbonate, ammonium carbonate, ammonium chloride, hydrochloric acid, sulfuric acid and phosphoric acid, and organic acids such as acetic acid and phenol. Of these compounds, there are preferably employed, for example, sulfonic acid type ion exchange resins, and weakly acidic inorganic acids such as ammonium carbonate.

The process of the present invention, as described above, prevents polymerization of the polyalkylene glycol polycarbonate, which is caused when the unreacted carbonate is distilled off in the presence of the basic catalyst, by removing at first the basic catalyst and then the unreacted carbonate by distillation at a reduced pressure, and the desired polyalkylene glycol polycarbonate can be obtained in a high yield.

The thus obtained polyalkylene glycol polycarbonate may be freed from a trace amount of impurities, if necessary, by treating it with adsorbents such as activated clay and activated carbon or by washing it with water. Such a treatment removes a trace amount of ionic compounds and polar compounds, and hence the thus obtained polyalkylene glycol polycarbonate can be stably stored.

In the case of using dimethyl carbonate as a carbonate in the above-described reaction in the process of the present invention, a solvent for forming an azeotropic mixture such as cyclohexane, benzene and hexane may be added in the reaction system before starting the reaction, and methanol produced may be removed from the reaction system as an azeotropic mixture with the solvent for forming an azeotropic mixture instead of removing methanol as an azeotropic mixture with dimethyl carbonate. The solvent for forming an azeotropic mixture is usually used in an amount of 5 to 100 parts by weight based on 100 parts by weight of dimethyl carbonate.

The above described procedure removes methanol as an azeotropic mixture with the above-mentioned solvent for forming an azeotropic mixture from the reaction system during the reaction, and the unreacted dimethyl methanol is recovered from the reaction mixture after completion of the reaction. The recovering yield can therefore be increased.

There is another procedure wherein methanol is recovered as an azeotropic mixture with dimethyl carbonate as described above, the above-mentioned solvent for forming an azeotropic mixture is added to the azeotropic mixture, methanol is removed as an azeotropic mixture with the solvent, and dimethyl carbonate is thus recovered.

Furthermore, the process for preparing a polyalkylene carbonate as described above may also be utilized when $R_{15}$ in the above-described general formula [VII] is an aliphatic group having 4 to 6 carbon atoms.

EFFECTS OF THE INVENTION

The lubricant oil compositions according to this invention have excellent lubricating properties and detergency, and their viscosity at low temperature can be easily decreased compared with mineral oil or ester lubricant oil.

As a result, the lubricant oil compositions according to this invention can be widely used as industrial gear oil, automotive engine oil, automotive gear oil, lubricant oil for refrigerators including car air conditioners and refrigerators, lubricant oil for fibers and rolling lubricant oil.

The lubricant oil compositions according to this invention are excellent not only in the above-described properties but also in mutual solubility with ozone layer-nondestructive Freon including Freon R-134a, and therefore they can be used as lubricant oil for refrigerators where ozone layer-nondestructive Freon such as Freon R-134a is employed as a refrigerant.

Concrete effects obtained when lubricant oil compositions according to this invention are used as the above-mentioned lubricant oils are described below.

(1) Industrial gear oil

The lubricant oil compositions of this invention can be used not only as general industrial gear oil but also as chain oil for which particularly excellent detergency and lubricating properties are required.

(2) Automotive engine oil

The lubricant oil compositions of this invention are excellent in lubricating properties and detergency, and accordingly they can meet the recent requirement of highly improved properties for engine oil of which detergency is considered important.

The additives such as cleaning-dispersants and stabilizers for the lubricant oil compositions of this invention can be reduced in amounts to be added compared with those used in the conventional automotive engine oil, and therefore problems such as mayonnaise sludge formation and precipitation of insoluble components can be overcome.

Furthermore, since the lubricant oil compositions of this invention are excellent in both lubricant properties and detergency compared with the conventional lubricant oil for two-cycle engines, they can also be used as engine oil for two-cycle engines in addition to four-cycle engines.

(3) Automotive gear oil

The lubricant oil compositions of this invention are excellent in lubricating properties and detergency, and in addition they have a friction coefficient which is low and changes little with the lapse of time.

(4) Lubricant oil for refrigerators

Since the lubricant oil compositions of this invention comprise a specific polyalkylene glycol polycarbonate (oligocarbonate or polyol carbonate), they are soluble in Freon R-134a ($CH_2F$—$CF_3$) which is a HFC nondestructive to the ozone layer and used as a refrigerant gas, have moreover excellent thermal stability and hygroscopicity resistance, and they prevent shrinkage of rubber sealing materials such as NBR to maintain sealing effects. In addition, the lubricant oil compositions of the invention can also maintain similar sealing effects for EPDM and SBR, and therefore EPDM and SBR can be employed as rubber sealing materials.

(5) Lubricant oil for fibers

The lubricant oil compositions of the invention have excellent lubricating properties and fuming-resistant properties compared with the conventional glycol ether lubricant oil.

(6) Rolling lubricant oil

Since the lubricant oil compositions of this invention have lubricating properties and rolling ability equal to or more excellent than those of the conventional rolling lubricant oil containing mainly tallow, and since they are volatilized without carbonization by only heating while maintaining detergency, cleaning process can be omitted.

The polyalkylene glycol polycarbonates according to this invention have polypropylene glycol group in the molecular chain and alkyloxyalkylene group at the molecular terminals.

Such polycarbonates are particularly excellent in mutual solubility with hydrogenated fluorocarbon which is nondestructive to the ozone layer, and therefore they can be appropriately used as lubricant oil for refrigerators. They have also an advantageous point that they have a low pour point and low hygroscopicity.

The use of the polyalkylene glycol polycarbonates according to this invention is not limited to the above-described one when they are used as lubricant oil, and they can also be utilized for industrial gear oil, automotive engine oil, automotive gear oil, rolling lubricant oil and lubricant oil for fibers.

The first process for preparing the polyalkylene glycol polycarbonate of this invention comprises two step reaction, carbonating reaction of a polyalkylene glycol in the presence or absence of a monoalcohol and carbonate interchange reaction of the thus obtained carbonate, and therefore the molecular terminals can be sealed with hydrocarbon group derived from the monoalcohol and/or carbonate. As a result, a polyalkylene glycol polycarbonate of which molecular terminals are substantially composed of only hydrocarbon group can be obtained.

Furthermore, the catalyst used in the reaction can be removed easily when the catalyst is neutralized with solid acid after the reaction.

According to the second process for preparing the polyalkylene glycol polycarbonate of this invention, the basic catalyst used in the reaction is removed after reaction between a polyol and a carbonate is completed, and then the unreacted carbonate is removed. As a result, a desired polyalkylene glycol polycarbonate can be obtained in a high yield.

The present invention is illustrated below with reference to examples, but it should be construed that the invention is in no way limited to those examples.

Test procedures described below were applied to perform analyses and evaluation of properties as lubricant oil of polyalkylene glycol polycarbonates (oligocarbonates or polyol carbonates) in Examples and Comparative Examples, and reference materials.

(1) Analytical Method a. Average molecular weight

The average molecular weight was obtained on the basis of polystyrene by using a GPC system manufactured by Shimazu Seisakusho K.K. The measuring conditions are as follows:

| | |
|---|---|
| column: | polystyrene gel 4 pieces (G-2000HXL + G-2000HXL + G-3000HXL + G-4000HXL); |
| detector: | differential refractometer; |
| temperature: | 40° C.; |
| solvent: | tetrahydrofuran; and |
| elution rate: | 0.7 ml/min. | b. IR absorption spectrum

The measurement was performed by coating KBr plates with a specimen material, and using an IR spectrophotometer (trade name of A-302, manufactured by Nippon Bunko K.K.).

c. NMR analysis

The average n values of compounds represented by the general formula [I] were determined by the proton NMR method (with an apparatus having a trade name of JNM-GX270, manufactured by Nihon Denshi K.K.).

(2) Evaluation Methods a. Kinematic viscosity by JIS K-2283 b. Viscosity index by JIS K-2283 c. Viscosity at low temperature by ASTM D 2983 d. Pour point by JIS K-2269 e. Friction characteristics

Friction coefficients of sample materials were measured under the following conditions by using a friction tester (trade name of SRV, manufactured by Optimol K.K.):

load: 200N;

temperature: 50° C.;

period of time: 10 min;

amplitude: 1 mm;

number of vibration; 50 Hz; and test pieces: a disc in combination with a sphere, both made of SUJ-2.

The depth of the resultant wear defect was determined by measuring the defect depth of the disc after test using a surface roughness meter (trade name of Surfcom 200B, manufactured by Tokyo Seimitsu K.K.).

f. Load Resistance Value

The load resistance value was obtained first by a running-in operation of a Falex tester with a load of 250 lbf for 5 minutes, then by increasing the load until seizure is observed, and by determining the load under which seizure is formed as the load resistance value.

g. Thermal Stability (i) A 20-g sample of an oligocarbonate is placed in a 100 ml beaker, and the beaker is heated at 100° C. for 6.5 hours in an oven. The thermal stability thereof is evaluated from an (amount of sample weight decrease)/(initial sample weight) ratio. The sample has better thermal stability when it shows a smaller change (decrease) ratio.

(ii) A 20-g sample of a polyol carbonate is placed in a 100 ml beaker, and the beaker is heated at 100° C. for 6.5 hours in an oven. The thermal stability thereof is evaluated from an (amount of sample weight decrease)/(initial sample weight) ratio. The sample has better thermal stability when it shows a smaller change (decrease) ratio.

h. Detergency

A 1-g sample is placed in a lid 5 cm in diameter of a container for ointment, and heated at 230° C. for 48 hours or 300° C. for 6 hours. In the case where the sample remains, it is black and solidified (in a carbonized state). The weight of the sample before and after the test is measured, and a remaining ratio of the sample is defined as a sludge formation ratio, from which detergency of the sample is evaluated.

i. Hygroscopicity

A 100 ml beaker is charged with a 30-g sample, and allowed to stand still for 48 hours in an air conditioning bath kept at a temperature of 25° C. and relative humidity of 75%. The water concentration of the sample before and after the test is measured by Karl Fischer's method.

j. Rubber swelling properties

A flask containing a 20-ml sample is charged with 2 kinds of O-rings (P-22), that is a nitrile rubber O-ring (JIS B 2401 1B) and a fluororubber O-ring (JIS B 2401 4D), equipped with a condenser, and immersed in an oil bath at 120° C. for 70 hours. The two O-rings are taken out from the flask after the test, freed from the sample by wiping sufficiently, and the weight change of the O-rings is measured.

k. Mutual solubility with Freon R-134a (i) A test tube having an inner diameter of 10 mm and height of 20 cm is charged with a 1 ml-sample, and Freon R-134a is slowly introduced into the test tube in an amount slightly larger than that of the sample from a bomb container while the test tube is being cooled in a dry ice-acetone bath. Then, the content is stirred by a spatula, and the test tube is transferred to a cooling bath at −20° C. The solubility of the sample is observed when the volume ratio of sample/(Freon R-134a) becomes 1/1. The mutual solubility is designated as 0 (mark) when the mixture becomes completely uniform, and it is designated as X (mark) when complete dissolution of the mixture is not observed.

(ii) To further investigate the mutual solubility of a carbonate product with Freon R-134a, lubricant oil and Freon R-134a are sealed in glass tubes in various proportions, and a limit temperature (critical temperature) where both substances are mutually dissolved is sought.

EXAMPLE 1

First, a 2-liter four neck flask with a distillate-separation tube and a thermometer was charged with 124 g (0.6 mol) of triethylene glycol mono-n-butyl ether, 210 g (1.4 mols) of triethylene glycol and 473 g (4 mols) of diethyl carbonate, and purged with nitrogen. Thereafter, 6 ml of tetraisopropyl titanate was added. The mixture was heated with stirring in an oil bath, and refluxed after setting the bath temperature at 150° C. When the internal temperature of the flask became below 115° C. with formation of ethanol, the content was heated to a temperature of not less than 115° C. by drawing a small amount of the distillate, and held at the temperature for 30 hours.

Then, the distillate separation tube was replaced with a distillation apparatus, and the ambient pressure was gradually reduced to 20 mmHg while the oil bath temperature was being held at 150° C. The reaction was terminated after maintaining the pressure at 20 mm Hg for 30 minutes.

The reaction mixture was diluted with xylene in about half as much a volume as that of the mixture. The diluted mixture was transferred to a separation funnel, washed with water 3 times, and dehydrated with silica gel overnight. The dehydrated solution was treated at 160° C. and 5 mm Hg in a rotary evaporator to be freed from xylene, and there was obtained 205 g of a polyalkylene glycol polycarbonate in a liquid state at room temperature.

Figure 2:
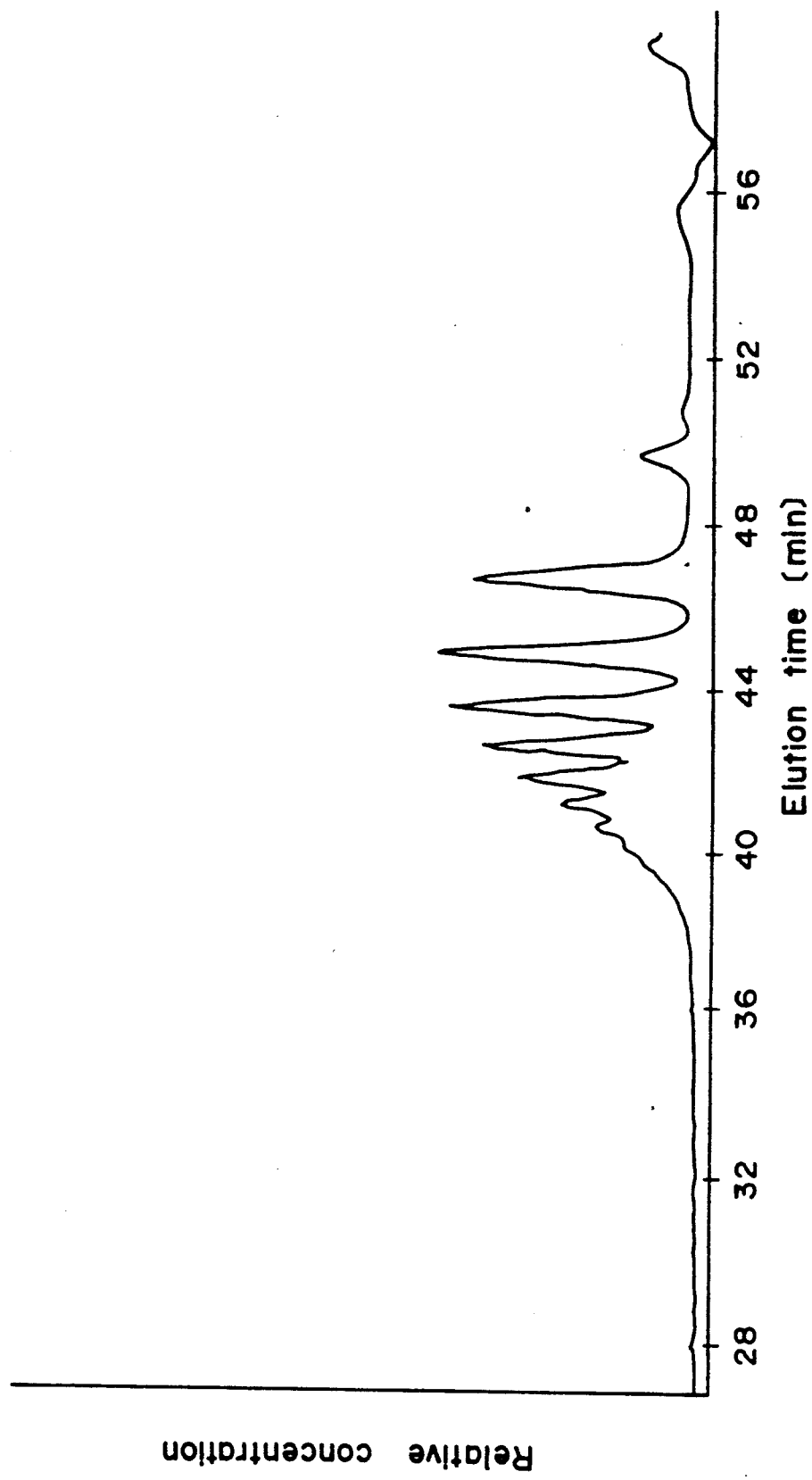
FIG. 2 is a gas permeation chromatogram (GPC) of the polyalkylene glycol polycarbonate obtained in Example 1.

FIG. 1 shows the IR-ray absorption spectrum of the thus obtained polyalkylene glycol polycarbonate, and FIG. 2 shows the GPC graph thereof. The polyalkylene glycol polycarbonate had a $\overline{Mn}$ of 890 and a $\overline{Mw}/\overline{Mn}$ ratio of 1.3. NMR analysis thereof showed an average n value of 2.0.

Evaluation results of the fundamental properties thereof as lubricant oil are shown in Table 1.

EXAMPLE 2

Example 1 was repeated except that 99 g (0.6 mol) of triethylene glycol monomethyl ether was used in place of triethylene glycol mono-n-butyl ether to obtain 177 g of a polyalkylene glycol polycarbonate in a liquid state at room temperature.

The thus obtained polyalkylene glycol polycarbonate had a $\overline{Mn}$ of 1340 and a $\overline{Mw}/\overline{Mn}$ ratio of 1.5. NMR analysis thereof showed an average n value of 4.7.

Evaluation results of the fundamental properties thereof as lubricant oil are shown in Table 1.

EXAMPLE 3

Example 1 was repeated except that there were used 200 g (1 mol) of tridecanol (mixture of branched isomers, prepared by Tokyo Kaseihin K.K.), 150 g (1 mol) of triethylene glycol, 473 g (4 mols) of diethyl carbonate and 3 ml of tetraisopropyl titanate to obtain 172 g of a polyalkylene glycol polycarbonate in a liquid state at room temperature.

The thus obtained polyalkylene glycol polycarbonate had a $\overline{Mn}$ of 990 and a $\overline{Mw}/\overline{Mn}$ ratio of 1.3. NMR analysis thereof showed an average n value of 2.9.

Evaluation results of the fundamental properties thereof as lubricant oil are shown in Table 1.

EXAMPLE 4

Example 1 was repeated except that there were used 200 g (1 mol) of tridecanol (mixture of branched isomers, prepared by Tokyo Kaseihin K.K.), 385 g (2.6 mols) of triethylene glycol, 473 g (4 mols) of diethyl carbonate and 6 ml of tetraisopropyl titanate to obtain 338 g of a polyalkylene glycol polycarbonate in a liquid state at room temperature.

The thus obtained polyalkylene glycol polycarbonate had a $\overline{Mn}$ of 890 and a $\overline{Mw}/\overline{Mn}$ ratio of 1.2. NMR analysis thereof showed an average n value of 2.4.

Evaluation results of the fundamental properties thereof as lubricant oil are shown in Table 1.

EXAMPLE 5

Bis{2-[2-(2-methoxyethoxy)ethoxy]ethyl} carbonate in an amount of 50 parts by weight was mixed with 50 parts by weight of the polyalkylene glycol polycarbonate obtained in Example 2.

The thus obtained mixture had a $\overline{Mn}$ of 620 and a $\overline{Mw}/\overline{Mn}$ ratio of 2.0. NMR analysis thereof showed an average n value of 1.2.

Evaluation results of the fundamental properties thereof as lubricant oil are shown in Table 1.

COMPARATIVE EXAMPLE 1

Commercial mineral oil (trade name of 100 Neutral, prepared by Fuji Sekiyu K.K.) was similarly evaluated as lubricant oil.

Evaluation results of the fundamental properties thereof as lubricant oil are shown in Table 1.

COMPARATIVE EXAMPLE 2

Commercial decene oligomer (trade name of Synfluid 401, prepared by Shinnitetsu Kagaku K.K.) was similarly evaluated as lubricant oil.

Evaluation results of the fundamental properties thereof as lubricant oil are shown in Table 1.

COMPARATIVE EXAMPLE 3

Diisodecyl adipate (DIDA) was similarly evaluated as lubricant oil.

Evaluation results of the fundamental properties thereof as lubricant oil are shown in Table 1.

It is clear from Table 1 that the polyalkylene glycol polycarbonates obtained in the above-described Examples each have improved friction characteristics and detergency compared with lubricant oils in Comparative Examples 1 to 3, and that they are therefore suitable for use as lubricant oil for which such properties are considered important.

COMPARATIVE EXAMPLE 4

Diisotridecyl carbonate was similarly evaluated as lubricant oil.

Evaluation results of the fundamental properties thereof as lubricant oil are shown in Table 1.

It is clear from Table 1 that the polyalkylene glycol polycarbonates obtained in the above-described Examples each have improved detergency compared with the compound in Comparative Example 4, that they show no shrinking properties and god sealing properties for nitrile rubber due to weakly swelling properties, that they have excellent mutual solubility with Freon R-134a, and that they are therefore especially advantageous to be used for lubricant oil of refrigerators where a ozone layer-nondestructive refrigerant is employed.

COMPARATIVE EXAMPLE 5

A propylene oxide type glycol ether ($\overline{Mn}$ of 1520, $\overline{Mw}/\overline{Mn}$ of 1.1) was similarly evaluated as lubricant oil.

Evaluation results of the fundamental properties thereof as lubricant oil are shown in Table 1.

It is clear from Table 1 that the polyalkylene glycol polycarbonates obtained in the above-described Examples each have good mutual solubility with Freon R-134a, decreased hygroscopicity, no shrinking properties and good sealing properties for nitrile rubber due to weakly swelling properties thereof and excellent lubricating properties compared with the glycol ether in Comparative Example 5, and that they are therefore especially suitable for lubricant oil for each detergency is considered important.

COMPARATIVE EXAMPLE 6

Similar evaluation was conducted on lubricant oil (trade name of Suniso 331, prepared by Nihon Sun Sekiyu K.K.) for refrigerators where currently used Freon R-12 was employed. Evaluation results of the fundamental properties thereof as lubricant oil are shown in Table 1.

The lubricant oil is not mutually soluble with Freon R-134a which is nondestructive to the ozone layer.

COMPARATIVE EXAMPLE 7

Tallow for rolling oil was evaluated similarly.

Evaluation results of the fundamental properties thereof as lubricant oil are shown in Table 1.

From the comparison of tallow in Comparative Example 7 with polyalkylene glycol polycarbonates in Examples described above, it can be concluded that though tallow has lubricating properties comparable to those of the polyalkylene glycol polycarbonates, it shows extremely poor detergency.

TABLE 1

| | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|
| Viscosity characteristics | | | | | | | | | | | | |
| 100° C. Kinematic viscosity [cSt] | 12.0 | 45.1 | 11.1 | 15.3 | 10.1 | 4.3 | 3.7 | 3.7 | 3.4 | 10.6 | 6.0 | 9.0 |
| 40° C. Kinematic viscosity [cSt] | 79.8 | 492.4 | 86.6 | 118.5 | 57.5 | 22.2 | 16.5 | 14.4 | 14.5 | 55.8 | 54.9 | Solid |
| −20° C. Viscosity [poise] | 160 | 950 | 320 | 400 | 35 | Solid | 4 | 3 | 3 | 40 | 160 | Solid |
| Friction characteristics | | | | | | | | | | | | |
| Friction coefficient | 0.09 | 0.10 | 0.10 | 0.10 | 0.10 | 0.20 | 0.18 | 0.15 | 0.11 | 0.13 | 0.22 | 0.09 |
| Wear depth [μm] | 0.2 | 0.5 | 0.5 | 0.6 | 0.7 | 2.8 | 1.9 | 1.5 | 0.4 | 2.8 | 1.2 | 0.02 |
| Thermal stability*[1] (wt. change) [%] | −8.9 | −10.8 | −10.5 | −3.2 | −9.2 | −30.0 | −3.5 | −3.6 | −20.5 | −14.5 | −15.3 | −3.2 |
| Detergency | | | | | | | | | | | | |
| 230° C., 48 hrs | 1.5 | 2.2 | 1.4 | 2.8 | 1.7 | 13.1 | 13.5 | 12.8 | 4.2 | 4.9 | 15.1 | 76.5 |
| 300° C., 6 hrs | <0.1 | 0.2 | <0.1 | <0.1 | <0.1 | 4.5 | 3.5 | 1.5 | 0.3 | 2.2 | 5.0 | 44.9 |
| Hygroscopicity (Water content %) | | | | | | | | | | | | |
| Initial | 0.05 | 0.08 | 0.39 | 0.06 | 0.45 | 0.006 | 0.005 | 0.05 | 0.02 | 0.08 | 0.006 | *3 |
| After test | 0.08 | 0.12 | 0.40 | 0.10 | 0.70 | 0.007 | 0.006 | 0.45 | 0.04 | 2.45 | 0.007 | *3 |
| Rubber swelling properties (Wt. change) [%] | | | | | | | | | | | | |
| Nitrile rubber | +10.5 | +4.2 | +4.4 | +4.6 | +12.2 | +4.4 | +4.6 | +30.2 | −0.3 | −1.5 | +2.6 | *3 |
| Fluororubber | +2.3 | +1.8 | +2.0 | +1.5 | +8.5 | +0.4 | +0.5 | +6.5 | +0.3 | +0.4 | +0.3 | *3 |
| Mutual solubility*[2] | ◯ | ◯ | ◯ | ◯ | ◯ | X | X | X | X | ◯ | X | *3 |

TABLE 1-continued

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|
| with Freon R-134a | | | | | | | | | | | | |

*[1] By test procedure (1)
*[2] ○: With mutual solubility
X: Without mutual solubility
*3 No measurement

EXAMPLE 6

A 1 liter flask with a 10-tray sieve tray type distillation column was charged with 300 g (1.56 mols) of tripropylene glycol (TPG), 153 g (0.74 mol) of tripropylene glycol monomethyl ether (TPG-Me), 416 g (4.62 mols) of dimethyl carbonate (DMC) and 0.4 g of a methanol solution containing 28 wt. % of NaOCH$_3$ (0.002 mol as NaOCH$_3$), and the mixture was heated at 110° C. to 150° C. and a normal pressure while produced methanol was being distilled off as an azeotropic mixture with dimethyl carbonate to effect reaction. Distillation of methanol could not be observed when the distillation was continued for 8.3 hours (the above-described carbonating reaction being designated as a first step reaction).

Then, unreacted dimethyl carbonate was removed at a reduced pressure of 20 mmHg, and polymerization was carried out by heating the flask at 150° C. for 30 minutes at a reduced pressure of 20 mmHg while formed dimethyl carbonate was being distilled off (the carbonate interchange reaction at this stage being designated as a second step reaction).

The resultant polymerization products were diluted with 500 g of toluene, and the catalyst in the products was neutralized by passing the diluted products through a column packed with 12 g of Amberlist 15 (trade name, containing 4.5 mmol/g of acid, prepared by Organo K.K.). Toluene in the mixture was distilled off, and 501 g of a polypropylene glycol polycarbonate was obtained.

Dimethyl carbonate was recovered in an amount of 220 g (2.44 mols) in the first and second step reaction, and methanol was produced in an amount of 124 g (3.87 mols). The yield of methanol was 100% based on hydroxyl group (—OH) in mols of tripropylene glycol and tripropyulene glycol monomethyl ether as starting materials.

The thus obtained polypropylene glycol polycarbonate is a viscous liquid, and NMR analysis proved that it has a structure described below.

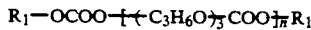

R$_1$ = CH$_3$―(OC$_3$H$_6$)$_{\overline{3}}$ in an amount of 61 mol %
R$_1$ = CH$_3$— in an amount of 39 mol %
average value of n = 3.0

$\overline{\text{Mn}}$ = 1,160 ($\overline{\text{Mn}}$ = 960 by NMR analysis)

$\overline{\text{Mw}}/\overline{\text{Mn}}$ = 1.5

Hydroxyl group was not observed by IR absorption spectrum analysis.

Evaluation results of fundamental properties of the thus obtained polypropylene glycol polycarbonate as lubricant oil are shown in Table 2.

EXAMPLE 7

Example 6 was repeated except that the charged amounts of tripropylene glycol monomethyl ether, dimethyl carbonate and a methanol solution containing 28 wt. % of NaOCH$_3$ were 190 g (0.92 mol), 450 g (4.99 mols) and 0.5 g (0.003 mol as NaOCH$_3$), respectively, and that a distillation time at the first step reaction was 8.5 hours to obtain 563 g of a polypropylene glycol polycarbonate.

Dimethyl carbonate was recovered in an amount of 229 g (2.54 mols) in the first and second step reaction, and methanol was produced in an amount of 130 g (4.05 mols). The yield of methanol was 100% based on hydroxyl group (—OH) in mols of tripropylene glycol and tripropylene glycol monomethyl ether as starting materials.

The thus obtained polypropylene glycol polycarbonate is a viscous liquid, and NMR analysis proved that it has a structure described below.

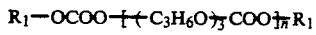

R$_1$ = CH$_3$―(OC$_3$H$_6$)$_{\overline{3}}$ in an amount of 47 mol %
R$_1$ = CH$_3$— in an amount of 53 mol %
average value of n = 2.7

$\overline{\text{Mn}}$ = 880 ($\overline{\text{Mn}}$ = 840 by NMR analysis)

$\overline{\text{Mw}}/\overline{\text{Mn}}$ = 1.6
remaining sodium = 1 ppm

Moreover, GPC analysis confirmed presence of compounds represented by the above-described formula wherein n=0, 1, 2, 3, 4 and 5.

Evaluation results of fundamental properties of the thus obtained polypropylene glycol polycarbonate as lubricant oil are shown in Table 2.

EXAMPLE 8

Example 6 was repeated except that the charged amounts of tripropylene glycol, dimethyl carbonate and a methanol solution containing 28 wt. % of NaOCH$_3$ were 384 g (2.00 mols), 541 g (6.00 mols) and 0.6 g (0.003 mol as NaOCH$_3$), respectively, that 90 g (1.00 mol) of propylene glycol monomethyl ether (PG-Me) was used in place of tripropylene glycol monomethyl ether, and that a distillation time at the first step reaction was 7.5 hours to obtain 537 g of a polypropylene glycol polycarbonate.

Dimethyl carbonate was recovered in an amount of 237 g (2.63 mols) in the first and second step reaction, and methanol was produced in an amount of 158 g (4.94 mols). The yield of methanol was 99% based on hydroxyl groups (—OH) in mols of tripropylene glycol and propylene glycol monomethyl ether as starting materials.

NMR analysis proved that the thus obtained polypropylene glycol polycarbonate has a structure described below.

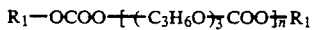

-continued $R_1 = CH_3OC_3H_6-$ in an amount of 62 mol %
$R_1 = CH_3-$ in an amount of 38 mol %
average value of n = 2.4

$\overline{Mn} = 700$ $\overline{Mw}/\overline{Mn} = 1.4$

Evaluation results of fundamental properties of the thus obtained polypropylene glycol polycarbonate as lubricant oil are shown in Table 2.

EXAMPLE 9

Example 6 was repeated except that the charged amounts of tripropylene glycol, dimethyl carbonate and a methanol solution containing 28 wt. % of NaOCH$_3$ were 385 g (2.00 mols), 541 g (6.00 mols) and 0.6 g (0.003 mol as NaOCH$_3$), respectively, that 75 g (1.01 mols) of n-butanol (n-BuOH) was used in place of tripropylene glycol monomethyl ether, and that a distillation time at the first step reaction was 8 hours to obtain 522 g of a polypropylene glycol polycarbonate.

Dimethyl carbonate was recovered in an amount of 230 g (2.56 mols) in the first and second step reaction, and methanol was produced in an amount of 161 g (5.03 mols). The yield of methanol was 100% based on hydroxyl group (—OH) in mols of tripropylene glycol and n-butanol as starting materials.

NMR analysis proved that the thus obtained polypropylene glycol polycarbonate has a structure described below.

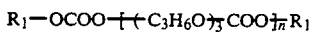

$R_1 = n-C_4H_9-$ in an amount of 61 mol %
$R_1 = CH_3-$ in an amount of 39 mol %
average value of n = 3.1

$\overline{Mn} = 820$ $\overline{Mw}/\overline{Mn} = 1.4$

Evaluation results of fundamental properties of the thus obtained polypropylene glycol polycarbonate as lubricant oil are shown in Table 2.

EXAMPLE 10

Example 6 was repeated except that the charged amounts of tripropylene glycol, dimethyl carbonate and a methanol solution containing 28 wt. % of NaOCH$_3$ were 384 g (2.00 mols), 541 g (6.00 mols) and 0.5 g (0.003 mol as NaOCH$_3$), respectively, that 206 g (1.00 mol) of triethylene glycol mono-n-butyl ether (TEG-n-Bu) was used in place of tripropylene glycol monomethyl ether, and that a distillation time at the first step reaction was 8 hours to obtain 662 g of a polypropylene glycol polycarbonate.

Dimethyl carbonate was recovered in an amount of 274 g (3.04 mols) in the first and second step reaction, and methanol was produced in an amount of 160 g (5.03 mols). The yield of methanol was 100% based on hydroxyl group (—OH) in mols of tripropylene glycol and triethylene glycol mono-n-butyl ether as starting materials.

The thus obtained polypropylene glycol polycarbonate is a viscous liquid, and NMR analysis proved that it has a structure described below.

-continued $R_1 = C_4H_9-(OC_2H_4)_3$ in an amount of 56 mol %
$R_1 = CH_3-$ in an amount of 44 mol %
average value of n = 2.4

$\overline{Mn} = 520$ ($\overline{Mn} = 810$ by NMR analysis)

$\overline{Mw}/\overline{Mn} = 2.8$

Evaluation results of fundamental properties of the thus obtained polypropylene glycol polycarbonate as lubricant oil are shown in Table 2.

EXAMPLE 11

A 2 liter reaction vessel with a 10-plate Oldershow type distillation column was charged with 502 g (1.25 mols) of polyethylene glycol (PEG) having an average molecular weight ($\overline{Mn}$) of 400, 1,134 g (12.59 mols) of dimethyl carbonate (DMC) and 0.2 g of a methanol solution containing 28% by weight of NaOCH$_3$ (0.001 mol as NaOCH$_3$), and purged with nitrogen. The reaction vessel was heated at 120° C. to 150° C. with stirring for 16 hours, and the resultant produced methanol was distilled of with dimethyl carbonate.

The residue was diluted with 400 g of toluene, and the remaining alkaline catalyst was neutralized by passing the mixture through a column filled with 12 g of Amberlist 15 (trade name, containing 4.5 mmol/g of acid, prepared by Organo K.K.).

The diluted residue was freed from toluene by heating it under a reduced pressure to obtain 609 g of a polyethylene glycol polycarbonate.

Methanol was produced in an amount of 81 g (2.52 mols), and dimethyl carbonate was recovered in an amount of 918 g (10.20 mols). The yield of methanol was 100% based on hydroxyl group (—OH) in mols of polyethylene glycol as a starting material.

NMR analysis proved that the thus obtained polyethylene glycol polycarbonate has a structure described below.

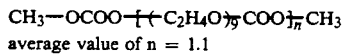
average value of n = 1.1

$\overline{Mn} = 850$ $\overline{Mw}/\overline{Mn} = 1.2$

Evaluation results of fundamental properties of the thus obtained polypropylene glycol polycarbonate as lubricant oil are shown in Table 2.

EXAMPLE 12

A 1 liter flask with a 10-tray sieve tray type distillation column was charged with 302 g (2.01 mols) of triethylene glycol (TEG), 541 g (6.01 mols) of dimethyl carbonate (DMC) and 0.4 g of a methanol solution containing 28 wt. % of NaOCH$_3$ (0.002 mol as NaOCH$_3$), and the mixture was heated at 110° to 150° C. at a normal pressure while produced methanol was being distilled off as an azeotropic mixture with dimethyl carbonate to achieve reaction. Distillation of methanol could not be observed when the distillation was continued for 11 hours.

Then, unreacted dimethyl carbonate was removed at a reduced pressure of 20 mmHg, and polymerization was carried out by heating the flask at 90° C. for 2 hours at a reduced pressure of 1 mmHg while formed dimethyl carbonate was being distilled off.

The resultant polymerization products were diluted with 500 g of toluene, and the catalyst in the products was neutralized by passing the diluted products through a column packed with 12 g of Amberlist 15 (trade name, containing 4.5 mmol/g of acid, prepared by Organo K.K.). Toluene was distilled off from the mixture under a reduced pressure, and 414 g of a polyethylene glycol polycarbonate was obtained.

Methanol thus produced was in an amount of 31 g (0.98 mol). The yield of methanol was 96% based on hydroxyl group (—OH) in mols of triethylene glycol as a starting material.

The thus obtained polypropylene glycol polycarbonate is a viscous liquid, and NMR analysis proved that it has a structure described below.

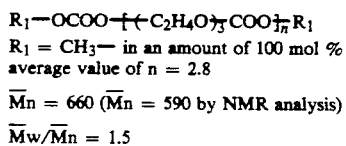

$R_1 = CH_3-$ in an amount of 100 mol %
average value of n = 2.8

$\overline{Mn} = 660$ ($\overline{Mn} = 590$ by NMR analysis)

$\overline{Mw}/\overline{Mn} = 1.5$

Evaluation results of fundamental properties of the thus obtained polypropylene glycol polycarbonate as lubricant oil are shown in Table 2.

was freed from toluene by heating under a reduced pressure to obtain 378.2 g of a product.

Methanol was produced in an amount of 21.6 g (0.67 mol), and dimethyl carbonate was recovered in an amount of 250.2 g (2.78 mols). Hydroxyl group could not be detected in the reaction product by IR analysis. GPC analysis and NMR analysis proved that the reaction product was a polypropylene glycol polycarbonate having the structure described below.

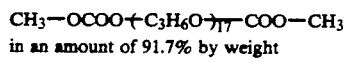

in an amount of 91.7% by weight

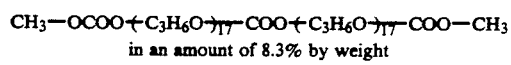

in an amount of 8.3% by weight

Figure 3:
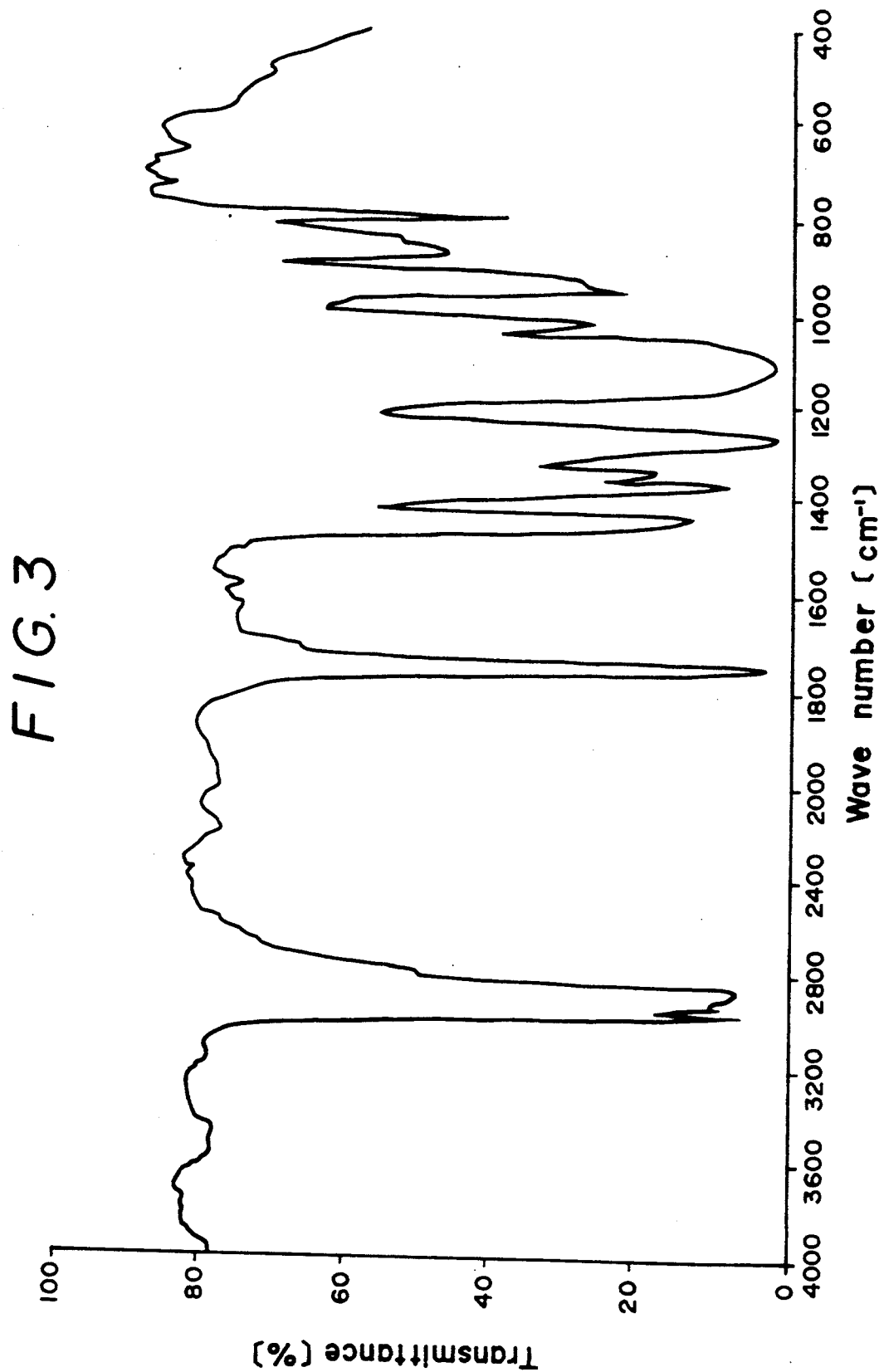
FIG. 3 is an IR absorption spectrum of a polypropylene glycol polycarbonate obtained in example 13.
Figure 4:
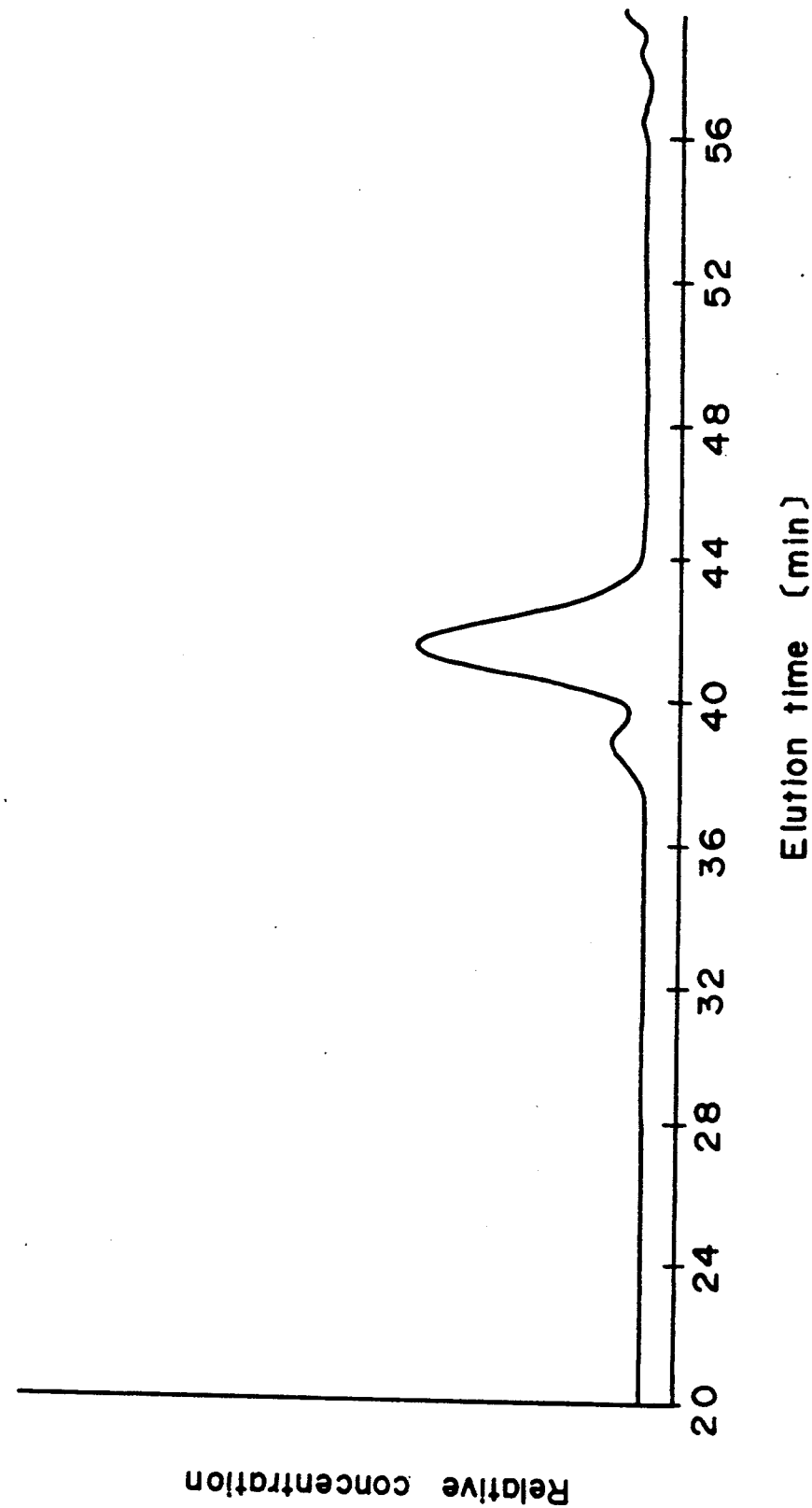
FIG. 4 is a GPC of the polypropylene glycol polycarbonate obtained in Example 13.

FIG. 3 shows the IR absorption spectrum graph of the polypropylene glycol polycarbonate, and FIG. 4 shows a GPC graph thereof.

Evaluation results of fundamental properties of the polypropylene glycol polycarbonate as lubricant oil are shown in Table 3.

EXAMPLE 14

First, a 2 liter four-neck flask with a distillate-separa-

TABLE 2

| | Ex. 6 | Ex. 7 | Ex. 8 | Ex. 9 | Ex. 10 | Ex. 11 | Ex. 12 |
|---|---|---|---|---|---|---|---|
| Viscosity characteristics | | | | | | | |
| 100° C. Kinematic viscosity [cSt] | 19.7 | 10.7 | 9.9 | 10.1 | 13.8 | 8.8 | 13.2 |
| 40° C. Kinematic viscosity [cSt] | 220.4 | 89.5 | 99.4 | 97.0 | 115.5 | 52.0 | — |
| Viscosity index | 102 | 103 | 72 | 81 | 117 | 149 | — |
| Pour point [°C.] | −25.0 | −32.5 | −25.0 | −25.0 | −22.5 | +2.5 | — |
| Friction characteristics | | | | | | | |
| Friction coefficient | — | — | — | — | — | — | — |
| Wear depth [μm] | — | 0.6 | — | — | — | — | — |
| Load resistance value [lbf] | 810 | 780 | 810 | 760 | 1000 | 1800 | — |
| Mutual solubility*1 with Freon R-134a (1) | ○ | ○ | ○ | ○ | ○ | ○ | ○ |
| (2) Critical temp. [°C.]*2 | | | | | | | |
| High temp. side | +79 | +90 | ≧+100 | ≧+100 | +83 | +65 | — |
| Low temp. side | ≦−70 | ≦−65 | ≦−65 | ≦−65 | ≦−65 | ≦−65 | |

*1○: With mutual solubility
X: without mutual solubility
*2Lubricant oil: 15 wt. %
Freon R-134a: 85 wt. %

EXAMPLE 13

A 2 liter reaction vessel with a 10-plate Oldershow type distillation column was charged with 349.4 g of polypropylene glycol having an average molecular weight ($\overline{Mn}$) of 1,000, 318.3 g (3.53 mols) of dimethyl carbonate and 0.07 g of a methanol solution containing 28% by weight of NaOCH₃ (0.4 mmol as NaOCH₃), and purged with nitrogen. The reaction vessel was heated at 120° C. to 140° C. with stirring for 13 hours, and the resultant produced methanol was distilled off with dimethyl carbonate. There was obtained 21.6 g of distillate methanol and 194.0 g of distillate dimethyl carbonate.

The reaction vessel was heated at 150° C. and a reduced pressure of 20 mmHg for 30 minutes, whereby 56.2 g of unreacted dimethyl carbonate was distilled off. The residue was diluted with 400 g of toluene, and the remaining alkaline catalyst was neutralized by passing the diluted residue through a column filled with 12 g of Amberlist 15 (trade name, containing 4.5 mmol/g of acid, prepared by Organo K.K.). The diluted residue tion tube and a thermometer was charged with 500 g (0.5 mol) of polypropylene glycol having an average molecular weight ($\overline{Mn}$) of 1,000 and 236 g (2 mols) of diethyl carbonate, and purged with nitrogen. Thereafter, 2.8 ml of tetraisopropyl titanate was added. The mixture was heated with stirring in an oil bath, and refluxed after setting the bath temperature at 150° C. When the internal temperature of the flask became below 115° C. with formation of ethanol, the internal temperature was brought to a temperature of not less than 115° C. by drawing a small amount of a distillate from the flask, and the mixture was held at the temperature for 50 hours.

The reaction solution was allowed to stand to cool, and water in ¼ times as much a volume as that of the reaction mixture was added thereto. The entire mixture was transferred to a separatory funnel, separated from the washing water, and further washed with water and separated from water twice.

The reaction solution was allowed to stand overnight with silica gel, filtered, and a volatile component was removed therefrom by holding the solution at a reduced pressure of 5 mmHg for 30 minutes in a rotary evaporator immersed in an oil bath at 150° C. to obtain 394 g of a desired reaction product.

IR analysis of the product could not detect hydroxyl group. GPC analysis and NMR analysis of the product confirmed that the product is a polypropylene glycol polycarbonate having the structure described below.

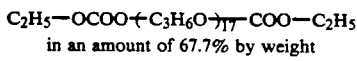

in an amount of 67.7% by weight

 and other polymers in an amount of 32.3% by weight

Evaluation results of the fundamental properties thereof as lubricant oil are shown in Table 3.

TABLE 3

|  | Ex. 13 | Ex. 14 | Comp. Ex. 8 | Comp. Ex. 9 |
|---|---|---|---|---|
| Viscosity characteristics |  |  |  |  |
| 100° C. Kinematic viscosity [cSt] | 12.4 | 16.2 | 10.6 | 6.0 |
| 40° C. Kinematic viscosity [cSt] | 75.5 | 107 | 55.8 | 54.9 |
| −20° C. Viscosity [poise] | 112 | 95.9 | 40 | 160 |
| Friction characteristics |  |  |  |  |
| Friction coefficient | 0.12 | 0.12 | 0.13 | 0.22 |
| Wear depth [μm] | 0.6 | 0.6 | 2.8 | 1.2 |
| Thermal stability*[1] (wt. change) [%] | 2.1 | 2.0 | −6.5 | −10.5 |
| detergency |  |  |  |  |
| 230° C., 48 hrs | 4.2 | 4.4 | 4.9 | 15.1 |
| 300° C., 6 hrs | 0.2 | 0.3 | 2.2 | 5.0 |
| Hygroscopicity (Water content %) |  |  |  |  |
| Initial | 0.11 | 0.10 | 0.08 | 0.006 |
| After test | 0.93 | 0.90 | 2.45 | 0.007 |
| Rubber swelling properties (Wt. change) [%] |  |  |  |  |
| Nitrile rubber | +4.2 | +3.9 | −1.5 | +2.6 |
| Fluororubber | +1.8 | +1.2 | +0.4 | +0.3 |
| Mutual solubility*[2] with Freon R-134a | ◯ | ◯ | ◯ | X |

*[1]By test procedure (2)
*[2]◯: With mutual solubility
X: without mutual solubility

COMPARATIVE EXAMPLE 8

Thermal stability of propylene oxide type glycol ether ($\overline{Mn}$=1,520, $\overline{Mw}/\overline{Mn}$=1.1) in Comparative Example 5 was evaluated by the test procedure in (ii) described above.

Evaluation results of the fundamental properties thereof as lubricant oil are shown in Table 3.

It is clear from Table 3 that the polyalkylene glycol polycarbonates obtained in the above-described Examples each have similar good mutual solubility with Freon R-134a, low hygroscopicity, no shrinking properties and good sealing properties for nitrile rubber due to weakly swelling properties, and excellent lubricating properties compared with said propylene oxide type glycol ether. Moreover, said polyalkylene glycol polycarbonates each have significantly improved lubricating properties compared with said propylene oxide type glycol ether, and therefore it is clear that they are also suitable for lubricant oil for which detergency is considered important.

The polypropylene glycol polycarbonate lubricant oil in Example 13 and the propylene oxide type glycol ether lubricant oil in Comparative Example 8 were separately sealed in glass tubes with Freon R-134a in various proportions, and limit temperatures (critical temperature) where both liquids are mutually soluble were sought to investigate in detail mutual solubility of both type of lubricant oils with Freon R-134a.

The results are shown in Table 4.

COMPARATIVE EXAMPLE 9

There was evaluated thermal stability of the lubricant oil (trade name of Suniso 331, prepared in Nippon Sun Sekiyu K.K.) in Comparative Example 6 used for refrigerators with a currently used refrigerant of Freon R-12 by a procedure in (ii) described above.

Evaluation results of the fundamental properties thereof as lubricant oil are shown in Table 3.

This lubricant oil is not mutually soluble with Freon R-134a which is nondestructive to the ozone layer.

TABLE 4

| Example |  | Ex. 13 | Comp. Ex. 8 |
|---|---|---|---|
| Critical temp. [°C.] | High temp. side | 78 | 50 |
|  | Low temp. side | <−70 | <−70 |

Note:
Lubricant oil: 15 wt. %
Freon R-134a: 85 wt. %

EXAMPLE 15

Example 11 was repeated except that 249 g (0.34 mol) of polypropylene glycol (PPG) having an average molecular weight ($\overline{Mn}$) of 725 was used in place of polyethylene glycol, that the amounts of dimethyl carbonate and a methanol solution containing 28% by weight of NaOCH$_3$ employed were 309 g (3.43 mols) and 0.1 g (0.001 mol as NaOCH$_3$), respectively, and that the reaction temperature and reaction time were 120° to 145° C. and 10.5 hours, respectively to obtain 276 g of a polypropylene glycol polycarbonate.

Furthermore, methanol was produced in an amount of 21 g (0.65 mol), and dimethyl carbonate was recovered in an amount of 259 g (2.87 mols). Methanol was obtained in a yield of 95% based on hydroxyl group (—OH) in number of mols in polypropylene glycol as a starting material.

NMR analysis of the thus obtained polypropylene glycol polycarbonate proved that it has the structure described below.

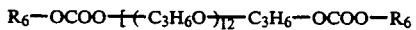

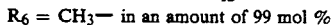

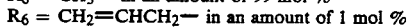

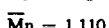

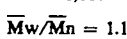

Evaluation results of the fundamental properties thereof as lubricant oil are shown in Table 6.

EXAMPLE 16

Example 11 was repeated except that 509 g (0.51 mol) of polypropylene glycol (PPG) having an average molecular weight ($\overline{Mn}$) of 1,000 was used in place of polyethylene glycol, that the amounts of dimethyl carbonate and a methanol solution containing 28% by weight of NaOCH$_3$ employed were 926 g (10.29 mols) and 0.1 g (0.001 mol as NaOCH$_3$), respectively, and that the reaction temperature and reaction time were 120° to 130° C. and 7 hours, respectively to obtain 557 g of a polypropylene glycol polycarbonate.

Furthermore, methanol was produced in an amount of 31 g (0.98 mol), and dimethyl carbonate was recovered in an amount of 845 g (9.39 mols). Methanol was obtained in a yield of 96% based on hydroxyl group (—OH) in number of mols in polypropylene glycol as a starting material.

NMR analysis of the thus obtained polypropylene glycol proved that it has the structure described below.

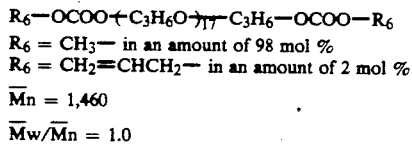

$R_6$—OCOO$\leftarrow$C$_3$H$_6$O$\rightarrow_{77}$C$_3$H$_6$—OCOO—$R_6$
$R_6$ = CH$_3$— in an amount of 98 mol %
$R_6$ = CH$_2$=CHCH$_2$— in an amount of 2 mol %

$\overline{Mn} = 1,460$ $\overline{Mw}/\overline{Mn} = 1.0$

Evaluation results of the fundamental properties thereof as lubricant oil are shown in Table 6.

EXAMPLE 17

Example 11 was repeated except that 400 g (1.00 mol) of polypropylene glycol (PPG) having an average molecular weight ($\overline{Mn}$) of 400 and 1,171 g (8.02 mols) of diisopropyl carbonate (DIPC) were employed in place of polyethylene glycol and dimethyl carbonate, respectively, and that the reaction temperature and reaction time were 120° to 175° C. and 9.8 hours, respectively to obtain 525 g of a polypropylene glycol polycarbonate.

Furthermore, isopropyl alcohol (IPA) was produced in an amount of 122 g, and diisopropyl carbonate was recovered in an amount of 899 g (6.16 mols). Isopropyl alcohol was obtained in a yield of 101% based on hydroxyl group (—OH) in number of mols in polypropylene glycol as a starting material.

NMR analysis of the thus obtained polypropylene glycol polycarbonate proved that it has the structure described below.

$R_6$—OCOO$\leftarrow$C$_3$H$_6$O$\rightarrow_5$C$_3$H$_6$—OCOO—$R_6$
$R_6$ = isopropyl-in an amount of 100 mol %

$\overline{Mn} = 710$ $\overline{Mw}/\overline{Mn} = 1.6$

Evaluation results of the fundamental properties thereof as lubricant oil are shown in Table 6.

EXAMPLE 18

Example 11 was repeated except that 640 g (1.60 mols) of polypropylene glycol (PPG) having an average molecular weight ($\overline{Mn}$) of 400 was used in place of polyethylene glycol, that the amounts of dimethyl carbonate and a methanol solution containing 28% by weight of NaOCH$_3$ employed were 1,153 g (12.80 mols) and 0.3 g (0.002 mol as NaOCH$_3$), respectively, and that the reaction temperature and reaction time were 120° to 130° C. and 7.5 hours, respectively to obtain 633 g of a polypropylene glycol polycarbonate.

Furthermore, methanol was produced in an amount of 105 g (3.27 mols), and dimethyl carbonate was recovered in an amount of 832 g (9.24 mols). Methanol was obtained in a yield of 102% based on hydroxyl group (—OH) in number of mols in polypropylene glycol as a starting material.

NMR analysis of the thus obtained polypropylene glycol polycarbonate proved that it has the structure described below.

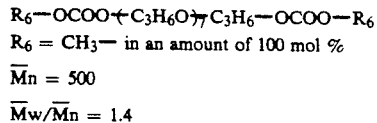

$R_6$—OCOO$\leftarrow$C$_3$H$_6$O$\rightarrow_7$C$_3$H$_6$—OCOO—$R_6$
$R_6$ = CH$_3$— in an amount of 100 mol %

$\overline{Mn} = 500$ $\overline{Mw}/\overline{Mn} = 1.4$

Evaluation results of the fundamental properties thereof as lubricant oil are shown in Table 6.

EXAMPLE 19

Example 11 was repeated except that 499 g (0.48 mol) of polypropylene triglycol (trade name of MW-1000 in a PPG-Triol series, prepared by Mitsui Toatsu K.K.) having an average molecular weight ($\overline{Mn}$) of 1,000 was used in place of polyethylene glycol, that the amounts of dimethyl carbonate and a methanol solution containing 28% by weight of NaOCH$_3$ employed were 928 g (10.31 mols) and 0.14 g (0.003 mol as NaOCH$_3$), respectively, and that the reaction temperature and reaction time were 110° to 120° C. and 7 hours, respectively to obtain methanol and a residue.

The residue was diluted with hexane, and the catalyst therein was neutralized with an aqueous solution containing 5 times as much an amount in mols of ammonium carbonate as that of NaOCH$_3$. The mixture was washed with water, and separated from hexane and unreacted dimethyl carbonate to obtain 576 g of a polyol carbonate.

Furthermore, methanol was produced in an amount of 46.3 g, and dimethyl carbonate was recovered in an amount of 769 g. Methanol was obtained in a yield of 101% based on hydroxyl group (—OH) in number of mols in polypropylene triglycol as a starting material.

Analyses by NMR, GPC and IR confirmed that the thus obtained polyol carbonate mainly contains polypropylene glycol trimethyl carbonate. The polyol carbonate had a $\overline{Mw}/\overline{Mn}$ ratio of 1.1.

Evaluation results of the fundamental properties thereof as lubricant oil are shown in Table 6.

EXAMPLE 20

Example 11 was repeated except that 318 g (0.6 mol) of a propylene oxide adduct of pentaerythritol (trade name of PE-450 in a PPG polyfunctional group series, prepared by Mitsui Toatsu Kagaku K.K.) having an average molecular weight ($\overline{Mn}$) of 500 was used in place of polyethylene glycol, that the amounts of dimethyl carbonate and a methanol solution containing 28% by weight of NaOCH$_3$ employed were 1,153 g (12.8 mols) and 0.28 g (0.006 mol as NaOCH$_3$), respectively, and that the reaction temperature and reaction time were 120° to 130° C. and 7 hours, respectively to obtain methanol and a residue.

Then, the residue was diluted with hexane, and the catalyst therein was neutralized with an aqueous solution containing 5 times as much an amount in mols of ammonium carbonate as that of NaOCH$_3$. The mixture was washed with water, and separated from hexane and unreacted dimethyl carbonate to obtain 457 g of a polyol carbonate.

Furthermore, methanol was produced in an amount of 83.7 g (2.61 mols), and dimethyl carbonate was recovered in an amount of 911 g. Methanol was obtained in a yield of 102% based on hydroxyl group (—OH) in number of mols in the propylene oxide adduct of pentaerythritol as a starting material.

Analyses by NMR, GPC and IR of the thus obtained polyol carbonate confirmed that it has the structure described below.

C─(CH₂O─(CH₂CH(CH₃)O)ₙ COO─CH₃)₄
n = 1 to 2

$\overline{Mw}/\overline{Mn} = 1.18$

Figure 5:
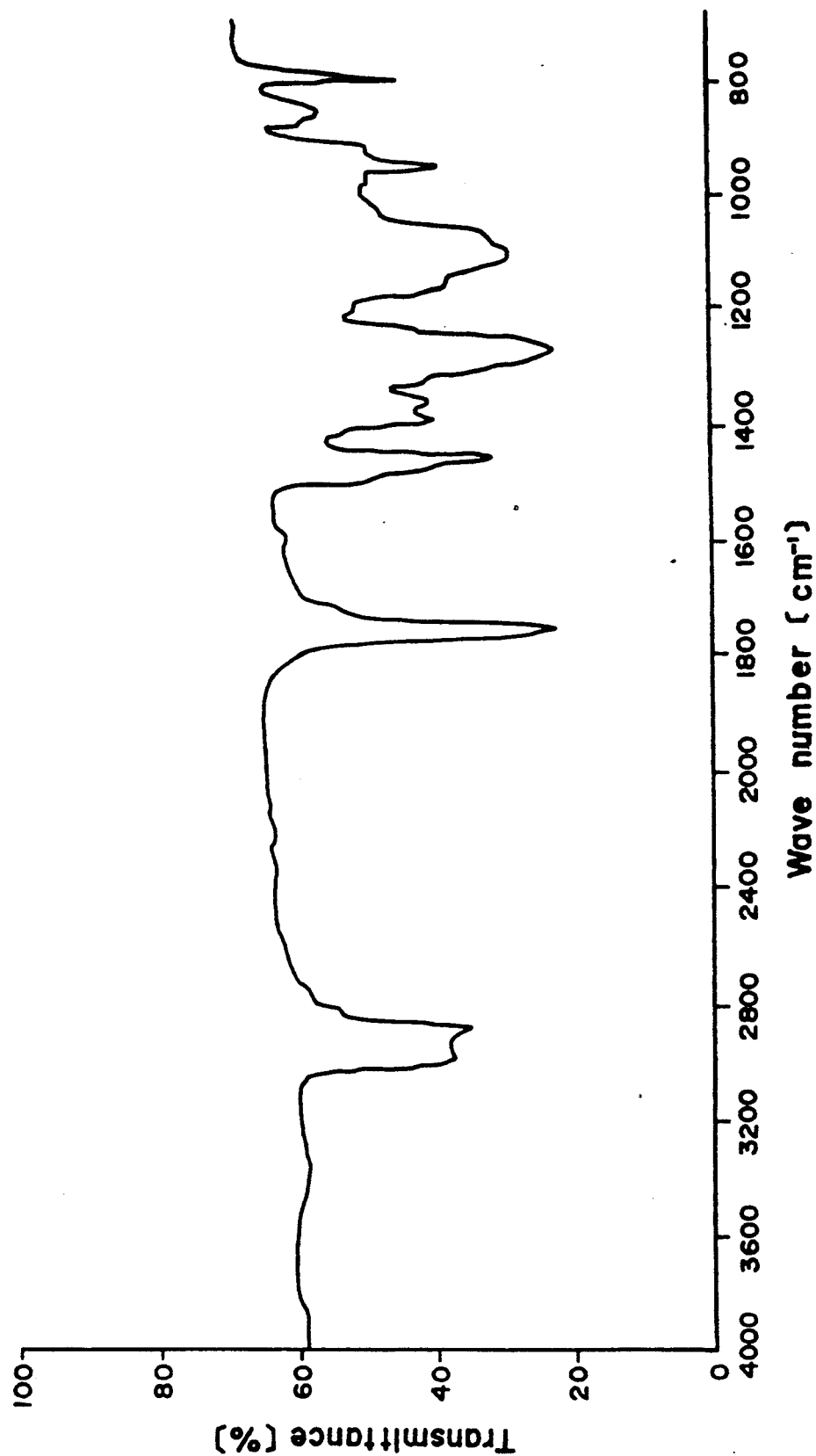
FIG. 5 is an IR absorption spectrum of the polyol carbonate obtained in Example 20.

An IR absorption spectrum of this compound is shown in FIG. 5.

Furthermore, data on ¹H-NMR of this compound are listed in Table 5.

TABLE 5

| δ [ppm] |
| --- |
| 1.15–1.3 (d) |
| 3.2–3.7 |
| 3.8 (s) |
| 4.2 (s) |
| 4.9 |

Note: The solvent employed was CDCl₃.

Evaluation results of the fundamental properties thereof as lubricant oil are shown in Table 6.

EXAMPLE 21

A 5 liter reaction vessel equipped with a 10-tray sieve tray type distillation column was charged with 1,206 g (1.21 mols) of polypropylene glycol having an average molecular weight of 1,000, 840 g (1.20 mols) of a polypropylene glycol having an average molecular weight of 700, 2,164 g (24.0 mols) of dimethyl carbonate and 0.14 g of a methanol solution containing 28% by weight of NaOCH₃ (0.003 mol as NaOCH₃), and reaction was carried out by heating the mixture at 110° to 120° C. under a normal pressure while produced methanol was being distilled off as an azeotropic mixture with dimethyl carbonate. Distillation of methanol was ceased after conducting the reaction for 9 hours. Methanol was obtained by the reaction in an amount of 155 g (4.83 mols) in a yield of 100%.

The reaction mixture was diluted with hexane, and the catalyst used in the reaction was neutralized with an aqueous solution containing 5 times as much an amount in mols of ammonium carbonate as that of NaOCH₃. The mixture was washed with water, and separated from hexane and unreacted dimethyl carbonate to obtain 2,314 g of a polycarbonate.

The thus obtained polycarbonate was a viscous liquid, and was confirmed to contain polypropylene glycol dimethyl carbonate as a main product by Analyses by proton NMR and GPC. A $\overline{Mw}/\overline{Mn}$ ratio of 1.1 was obtained for the polycarbonate by GPC analysis. In addition, the remaining amount of sodium was not greater than 0.05 ppm.

Evaluation results of the fundamental properties thereof as lubricant oil are shown in Table 6.

TABLE 6

| | Ex. 15 | Ex. 16 | Ex. 17 | Ex. 18 | Ex. 19 | Ex. 20 | Ex. 21 |
| --- | --- | --- | --- | --- | --- | --- | --- |
| Viscosity characteristics | | | | | | | |
| 100° C. Kinematic viscosity [cSt] | 8.7 | 11.7 | 7.14 | 4.1 | 15.2 | 16.5 | 10.0 |
| 40° C. Kinematic viscosity [cSt] | 51.8 | 70.7 | 46.22 | 26.9 | 108.4 | 274.8 | — |
| Viscosity index | 147 | 161 | 114 | 90 | 126 | 29 | — |
| Pour point [°C.] | −35.0 | −37.5 | −35.0 | −40.0 | −35.0 | −15.0 | — |
| Friction characteristics | | | | | | | |
| Friction coefficient | 0.12~0.13 | — | — | — | — | — | — |
| Wear depth [μm] | 0.8 | 1.1 | — | — | — | — | — |
| Load resistance value [lbf] | — | 800 | 780 | 720 | 820 | 710 | — |
| Mutual solubility*¹ with Freon R-134a (1) | ○ | ○ | ○ | ○ | ○ ' | ○ | ○ |
| (2) Critical temp. [°C.]*² | | | | | | | |
| High temp. side | +91 | +79 | ≧+100 | ≧+100 | +75 | +97 | — |
| Low temp. side | ≦−65 | ≦−65 | ≦−65 | ≦−65 | ≦−65 | ≦−65 | — |

*¹ ○: With mutual solubility
X: Without mutual solubility
*² Lubricant oil: 15 wt. %
Freon R-134a: 85 wt. %

What is claimed:

1. A polyalkylene glycol polycarbonate represented by the general formula [I]'

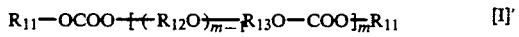
R₁₁─OCOO─((R₁₂O)ₘ─R₁₃O─COO)ₗₘR₁₁    [I]' wherein R₁₁ is each independently an alkyl group having 1 to 6 carbon atoms and an alkyloxalkylene group represented by the general formula

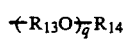
─(R₁₃O)ᵩR₁₄

(R₁₃ is an ethylene group or propylene group, R₁₄ is an alkyl group having 1 to 6 carbon atoms, and q is an integer of 1 to 10), R₁₂ is a propylene group, m is an integer of 2 to 10 and n is an integer of 3 to 10, and 10 to 95 mol % of the molecular terminal groups are occupied by said alkyloxyalkylene group.

2. A lubricant oil comprising the polyalkylene glycol polycarbonate as claimed in claim 1.

3. The lubricant oil for refrigerators which comprises the polyalkylene glycol polycarbonate as claimed in claim 1 and a fluorocarbon carbon compounds consisting of H, C and F atoms.

4. A polyalkylene glycol polycarbonate represented by the general formula [X]

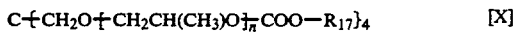
C─(CH₂O─(CH₂CH(CH₃)O)ₙ COO─R₁₇)₄    [X]

wherein R₁₇ is each independently a hydrocarbon group having not greater than 30 carbon atoms or a hydrocarbon group having ether bond and also having 2 to 30 carbon atoms, and the average value of n is 1 to 12.

5. The polyalkylene glycol polycarbonate as claimed in claim 4, wherein said polyalkylene glycol polycarbonate is represented by the formula $$C{+}CH_2O{+}CH_2CH(CH_3)O{\overline{\mathsf{n}}}COO-CH_3\}_4$$

wherein the average value of n is 1 to 2.

6. A lubricant oil comprising the polyalkylene glycol polycarbonate as claimed in claim 4.

7. A lubricant oil for refrigerators which comprises
a fluorocarbon compound consisting of H, C and F atoms and
a polyalkylene glycol polycarbonate represented by the formula (I)

$$R_1-OCOO{+}{+}R_2{\overline{z}}O{\overline{\mathsf{m}}}-COO{\overline{\mathsf{n}}}R_1 \qquad (I)$$

wherein $R_1$ is each independently a hydrocarbon group having not greater than 20 carbon atoms selected from an aliphatic group, an alicyclic group, an aromatic group or an aromatic-substituted aliphatic group, or an alkyloxyalkylene group represented by the formula $$-{+}{+}R_3{\overline{p}}O{\overline{q}}R_4$$

wherein $R_3$ is an alkylene group having 20 to 20 carbon atoms, $R_4$ is an aliphatic group, an alicyclic group or an aromatic group each having not greater than 20 carbon atoms, p is an integer of 1 to 100 and q is an integer of 1 to 10;
$R_2$ is an alkylene group having 2 to 20 carbon atoms;
z is an integer of 1 to 100;
m is an integer of 1 to 10; and
n is an integer of 1 to 100.

8. A lubricant oil for refrigerators which comprises a fluorocarbon compound consisting of H, C and F atoms and a polyalkylene glycol polycarbonate represented by the general formula [VI]

$$R_5{+}OCOO-R_6)_j \qquad [VI]$$

wherein $R_5$ is a hydrocarbon group having a molecular weight of 85 to 10,000 or hydrocarbon group containing oxygen and having a molecular weight of 60 to 10,000, j is an integer of 2 to 10, $R_6$ is each independently a hydrocarbon group having not greater than 20 carbon atoms selected from an aliphatic group, an alicyclic group, an aromatic group or an aromatic-substituted aliphatic group, and alkyloxyalkylene group represented by the general formula $${+}R_7-O{\overline{k}}R_8$$

($R_7$ is an alkylene group having 2 to 20 carbon atoms, $R_8$ is an aliphatic group, an alicyclic group or an aromatic group each having not greater than 20 carbon atoms, k is an integer of 1 to 10).

* * * * *